(12) United States Patent
Ohno

(10) Patent No.: US 11,196,302 B2
(45) Date of Patent: Dec. 7, 2021

(54) RESONANCE APPARATUS, POWER TRANSMISSION APPARATUS, AND POWER TRANSMISSION METHOD

(71) Applicant: Laser Systems Inc., Anan (JP)

(72) Inventor: Yasuo Ohno, Kanagawa (JP)

(73) Assignee: LASER SYSTEMS INC., Anan (JP)

( * ) Notice: Subject to any disclaimer, the term of this patent is extended or adjusted under 35 U.S.C. 154(b) by 0 days.

(21) Appl. No.: 16/988,940

(22) Filed: Aug. 10, 2020

(65) Prior Publication Data

US 2021/0044153 A1    Feb. 11, 2021

(30) Foreign Application Priority Data

Aug. 8, 2019  (JP) .............................. JP2019-146680

(51) Int. Cl.
*H02J 50/40* (2016.01)
*H02J 50/80* (2016.01)

(52) U.S. Cl.
CPC .............. *H02J 50/40* (2016.02); *H02J 50/80* (2016.02)

(58) Field of Classification Search
CPC .................................. H02J 50/40; H02J 50/80
USPC ........................................................ 307/104
See application file for complete search history.

(56) References Cited

U.S. PATENT DOCUMENTS

| | | | | |
|---|---|---|---|---|
| 9,837,861 | B2 * | 12/2017 | Choi | H02J 50/12 |
| 9,902,271 | B2 * | 2/2018 | Ichikawa | B60L 53/126 |
| 10,854,378 | B2 * | 12/2020 | Teggatz | H01F 38/14 |
| 2010/0052431 | A1 * | 3/2010 | Mita | H01Q 1/248 |
| | | | | 307/104 |
| 2012/0223709 | A1 * | 9/2012 | Schillak | G01R 33/3621 |
| | | | | 324/309 |
| 2016/0190816 | A1 * | 6/2016 | Rehm | H02J 7/025 |
| | | | | 307/104 |

FOREIGN PATENT DOCUMENTS

| | | |
|---|---|---|
| JP | 4835334 B2 | 12/2011 |
| WO | 2016147293 A1 | 9/2016 |

OTHER PUBLICATIONS

I.Awai and A.K.Saha, "Open Ring Resonators Applicable to Wideband BPF", Proceedings of Asia-Pacific Microwave Conference 2006, ISBN:978-4-902339-08-6.

* cited by examiner

*Primary Examiner* — Alfonso Perez Borroto
(74) *Attorney, Agent, or Firm* — Cantor Colburn LLP

(57) ABSTRACT

Other resonators similar in shape to itself, with a partially open structure on a closed curve line, arranged opposite itself and a resonator that uses electromagnetic coupling to exchange high-frequency power or signals in a non-contact manner with its own The electrodes at the tip were arranged in the vicinity of the resonator in such a way that the electrodes at the tip were opposite the back or surface of the resonator. Extends from the circuit board to the resonator and transfers power or signals to and from the resonator through the electrodes. An input/output line, and an electrical connection between the electrode and the resonator or between the electrode and the resonator. A resonator whose position is adjustable.

9 Claims, 15 Drawing Sheets

RESONANCE APPARATUS, POWER TRANSMISSION APPARATUS, AND POWER TRANSMISSION METHOD

CROSS REFERENCE TO RELATED APPLICATIONS

The present invention claims priority under 35 U.S.C. § 119 to Japanese Application No. 2019-146680 filed Aug. 8, 2019, the entire content of which is incorporated herein by reference.

Technical Field

The present disclosure relates to a resonance apparatus, a power transmission apparatus, and a power transmission method.

Background Art

There has been known a power transmission apparatus that transmits and receives high-frequency power or a high-frequency signal (hereinafter collectively referred to as "high-frequency power") in a noncontact manner by using two open ring resonators (see, for example, PTL 1 and NPL 1).

This type of power transmission apparatus includes a transmission-side open ring resonator and a reception-side open ring resonator that are disposed facing each other. The power transmission apparatus causes the transmission-side open ring resonator and the reception-side open ring resonator to electromagnetically couple (for example, magnetically resonate) with each other to transmit high-frequency power from the transmission-side open ring resonator to the reception-side open ring resonator.

In general, open ring resonators are configured such that the transmission-side open ring resonator and the reception-side open ring resonator resonate at the same frequency, and are typically configured such that the line length of the ring is about $\lambda/2$ calculated from the resonant frequency.

The power transmission apparatus having such a configuration is capable of obtaining a high transmission efficiency in a noncontact manner and is thus expected to be applied to noncontact power transmission to a battery or the like built in an electronic apparatus and noncontact signal transmission between different circuit boards.

CITATION LIST

Patent Literature

PTL 1
Japanese Patent No. 4835334

Non Patent Literature

NPL 1
I. Awai and A. K. Saha, "Open Ring Resonators Applicable to Wide-band BPF", Proceedings of Asia-Pacific Microwave Conference 2006, ISBN:978-4-902339-08-6

In this type of power transmission apparatus, noncontact transmission of high-frequency power using electromagnetic coupling between one resonator and another resonator is equivalent to a band-pass filter using two resonators.

It is known that, when two open ring resonators are disposed close to each other, an electromagnetic interaction causes separation of the fundamental resonant frequency of the open ring resonators into a high-frequency-side resonant frequency and a low-frequency-side resonant frequency. Specifically, the state of electromagnetic coupling between the two open ring resonators determines a frequency band in which high-frequency power can be passed from one resonator to the other resonator, and generally the separated high-frequency-side resonant frequency and low-frequency-side resonant frequency correspond to the upper limit and the lower limit of the pass band in the frequency band. Note that a uniform transmission efficiency (i.e., transmittance) is not necessarily achieved within the frequency band, but the transmission efficiency in an intermediate region of the frequency band decreases (referred to as a double-humped frequency characteristic) or the transmission efficiency peaks in the intermediate region and decreases on both sides thereof depending on a connection condition.

Regarding the above, in a power transmission apparatus using open ring resonators, it is possible to transmit high-frequency power with a high transmission efficiency over a wide band between the separated high-frequency-side resonant frequency and low-frequency-side resonant frequency when the impedance of the resonator viewed from the input-output line on the transmission side (hereinafter referred to as "the input impedance of the resonator") and the impedance of the resonator viewed from the input-output line on the reception side (hereinafter referred to as "the output impedance of the resonator") are appropriately set (see PTL 1 and NPL 1). This is a band-pass filter having a so-called maximally flat (or Butterworth) frequency characteristic.

In this type of power transmission apparatus, there has been a demand for achieving a frequency characteristic in which a high transmission efficiency is obtained over a wide band as in a maximally flat band-pass filter from various points of view. For example, if a frequency characteristic in which a high transmission efficiency is obtained over a wide band can be achieved, power transmission can be performed with a high transmission efficiency even when the usage environment of the resonators changes and the separated high-frequency-side resonant frequency and low-frequency-side resonant frequency shift. In addition, this makes it possible to appropriately change the frequency to be used for power transmission.

PTL 1 and NPL 1 describe that a transmission characteristic having a maximally flat frequency characteristic can be achieved by appropriately setting the position at which an input/output line is connected to an open ring resonator. However, the input impedance of the resonator for changing the transmission characteristic from a double-bumped frequency characteristic to a maximally flat frequency characteristic actually changes depending on the state of electromagnetic coupling between resonators (i.e., the coupling coefficient between resonators), such as a usage environment. Thus, a configuration in which an open ring resonator and an input/output line are formed on the same circuit board, as in PTL 1, is incapable of addressing such a change.

SUMMARY OF INVENTION

The present disclosure has been made in view of the above-described issue and an object of the present disclosure is to provide a resonance apparatus, a power transmission apparatus, and a power transmission method that are capable of addressing a change in the state of electromagnetic coupling between resonators.

The present disclosure mainly solving the issue mentioned above provides a resonance apparatus, comprising:

a resonator having a structure in which a part of a closed-curve line is opened, the resonator performing transmission or reception of high-frequency power or a high-frequency signal to or from another resonator in a noncontact manner by using electromagnetic coupling, the other resonator being disposed facing the resonator and having a shape similar to a shape of the resonator; and an input/output line that extends from a circuit board disposed near the resonator toward the resonator such that an electrode portion disposed at an end of the input/output line faces a rear surface or a front surface of the resonator, the input/output line performing transmission or reception of the high-frequency power or the high-frequency signal to or from the resonator via the electrode portion, wherein a distance between the electrode portion and the resonator or an electrical connection position between the electrode portion and the resonator is adjustable.

In another aspect, a power transmission apparatus is provided, which comprises:

a first resonance apparatus; and a second resonance apparatus, the power transmission apparatus performing transmission and reception of a power or a signal in a noncontact manner between resonators respectively included in the first resonance apparatus and the second resonance apparatus, the first resonance apparatus and the second resonance apparatus each including a corresponding one of the resonators that has a structure in which a part of a closed-curve line is opened, the corresponding resonator performing transmission or reception of a high-frequency power or a high-frequency signal to or from the other one of the resonators in a noncontact manner by using electromagnetic coupling, the other resonator being disposed facing the corresponding resonator and having a shape similar to a shape of the corresponding resonator, and an input/output line that extends from a circuit board disposed near the corresponding resonator toward the corresponding resonator such that an electrode portion disposed at an end of the input/output line faces a rear surface or a front surface of the corresponding resonator, the input/output line performing transmission or reception of the power or the signal to or from the corresponding resonator via the electrode portion, wherein a distance between the electrode portion and the corresponding resonator or an electrical connection position between the electrode portion and the corresponding resonator is adjustable.

In still another aspect, a power transmission method is provided, which is a method using the power transmission apparatus according to claim 9.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DESCRIPTION OF EMBODIMENTS

Figure 1:
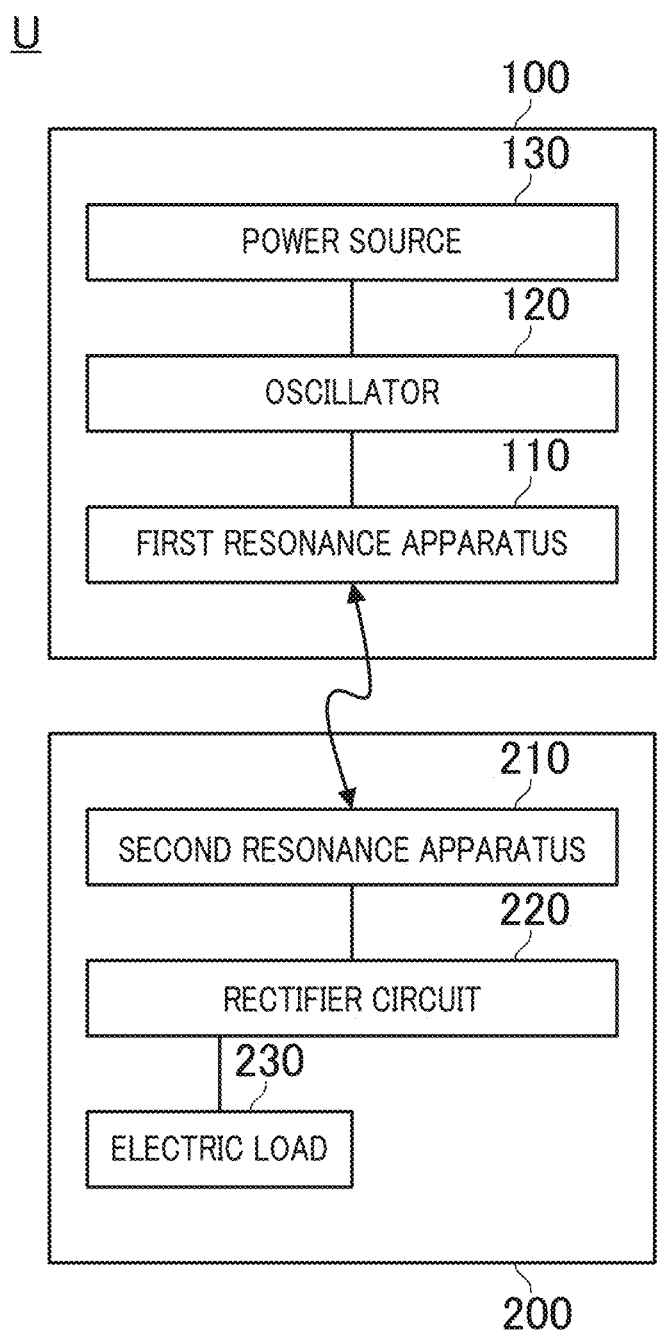
FIG. 1 is a diagram illustrating an overall configuration of a power transmission apparatus according to Embodiment 1.

Hereinafter, preferred embodiments of the present disclosure will be described in detail with reference to the attached drawings. In the specification and drawings, the components having substantially the same functions are denoted by the same reference numerals, and a duplicate description is not given.

Embodiment 1

[Overall Configuration of Power Transmission Apparatus]

Hereinafter, an example of the configuration of a power transmission apparatus according to the present embodiment will be described with reference to FIG. 1 to FIG. 4. The power transmission apparatus according to the present embodiment is applied to power transmission to an electric load.

FIG. 1 is a diagram illustrating an overall configuration of power transmission apparatus U according to the present embodiment.

Power transmission apparatus U includes receiving apparatus 200 and transmitting apparatus 100.

Transmitting apparatus 100 includes, for example, power source 130 (for example, a battery), oscillator 120 (for example, a semiconductor oscillator, a magnetron, or the like) that generates high-frequency power by using power supplied from power source 130, and first resonance apparatus 110 that transmits the high-frequency power obtained from oscillator 120 to second resonance apparatus 210 of receiving apparatus 200.

Receiving apparatus 200 includes, for example, second resonance apparatus 210 that receives high-frequency power from first resonance apparatus 110 of transmitting apparatus 100, rectifier circuit 220 that rectifies the high-frequency power received by second resonance apparatus 210, and electric load 230 (for example, a battery) that uses direct-current (DC) power generated through the rectification by rectifier circuit 220.

Receiving apparatus 200 and transmitting apparatus 100 are typically disposed so as to be separated from each other. Receiving apparatus 200 is mounted, for example, in an electric vehicle. Transmitting apparatus 100 is buried, for example, in the ground and serves as a power supply facility.

Figure 2:
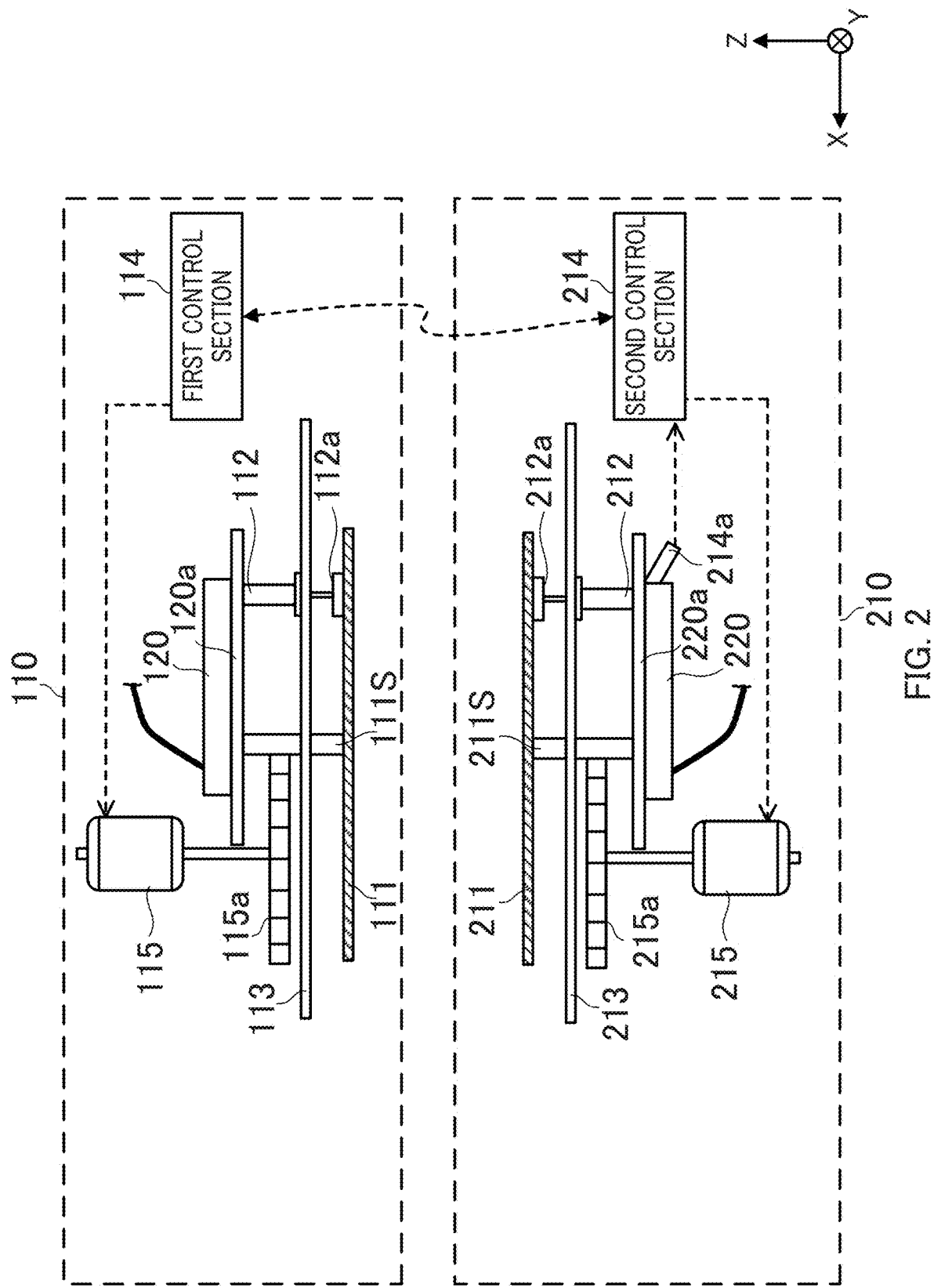
FIG. 2 is side view illustrating an example of the configurations of a first resonance apparatus and a second resonance apparatus according to Embodiment 1.
Figure 3:
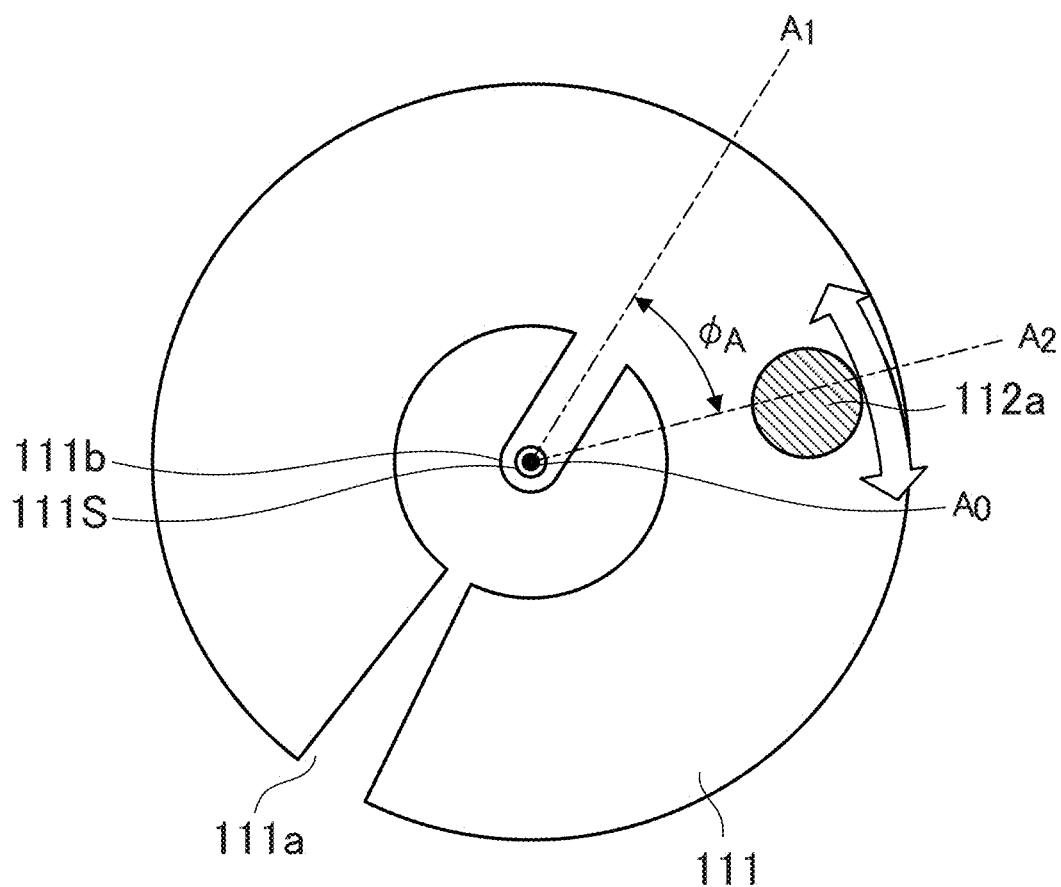
FIG. 3 is a plan view of a first resonator according to Embodiment 1.
Figure 3:
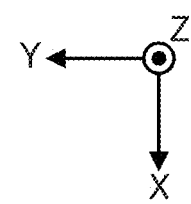
Figure 4:
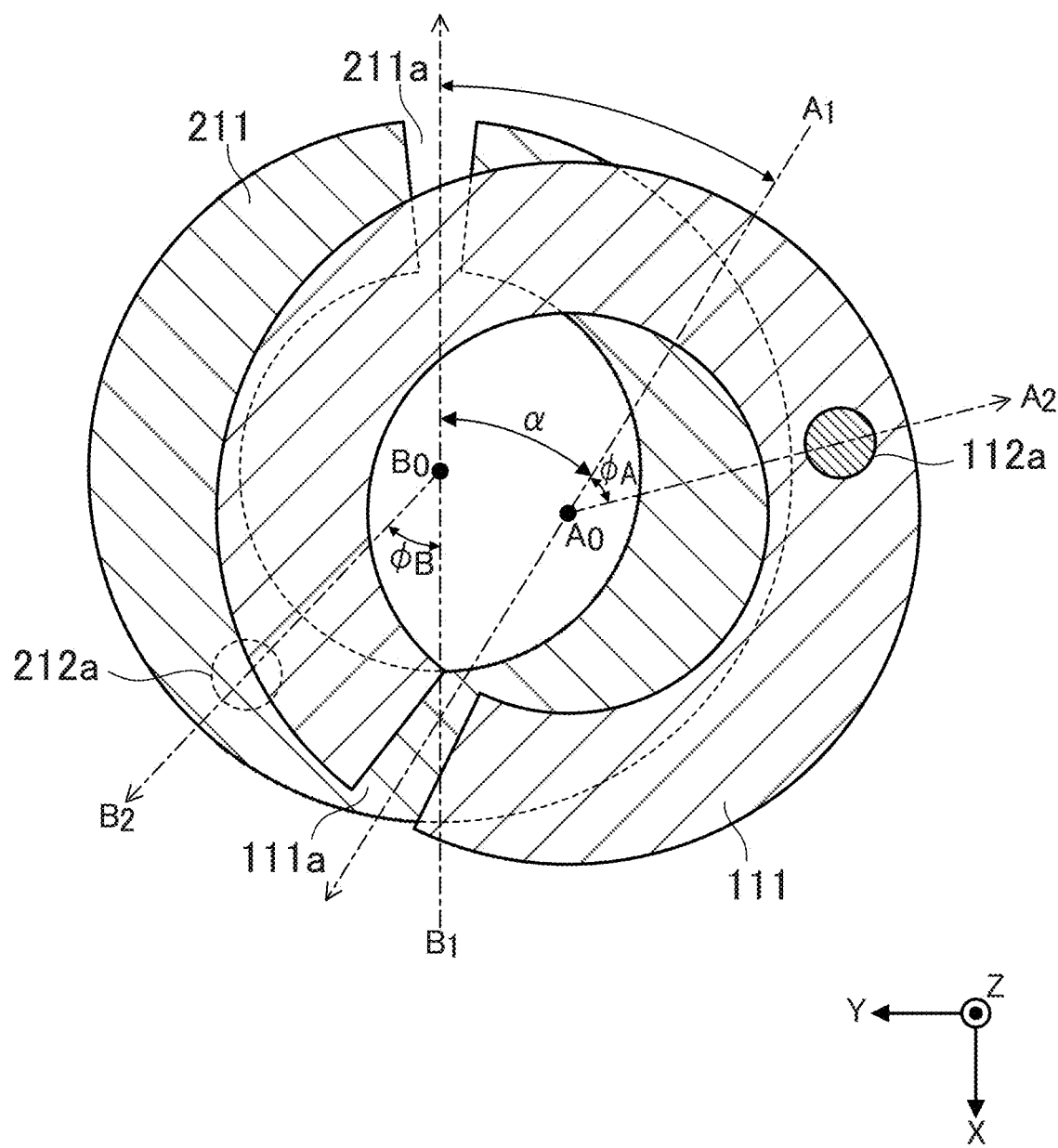
FIG. 4 is a plan view illustrating the positional relationship between the first resonator and a second resonator according to Embodiment 1.

FIG. 2 is side view illustrating an example of the configurations of first resonance apparatus 110 and second resonance apparatus 210 according to the present embodiment. FIG. 3 is a plan view of first resonator 111 according to the present embodiment. FIG. 4 is a plan view illustrating the positional relationship between first resonator 111 and second resonator 211 according to the present embodiment. In FIG. 4, protruding portions (111b and the like described below) of first resonator 111 and second resonator 211 are not illustrated.

First resonance apparatus 110 includes first resonator 111, first input/output line 112, first ground plate 113, first control section 114, and first driving section 115.

When first resonator 111 is disposed facing second resonator 211, first resonator 111 electromagnetically couples with second resonator 211 and performs transmission or reception of high-frequency power to or from second resonator 211 in a noncontact manner. Here, first resonator 111 transmits high-frequency power to second resonator 211.

First resonator 111 has a structure having opening portion 111a in a part of a closed-curve line (hereinafter referred to as an "open ring") as illustrated in FIG. 3. In other words, first resonator 111 has open ends at either end in a longitudinal direction. First resonator 111 is formed of, for example, a ring-shaped metallic plate having opening portion 111a. The length of the open ring of first resonator 111 is set to, for example, about ½ of the wavelength of high-frequency power to be transmitted and received, such that the both ends thereof, where a maximum potential difference is obtained, are close to each other.

First resonator 111 is disposed so as to be electrically connected to first input/output line 112, and obtains high-frequency power from oscillator 120 via first input/output line 112. First resonator 111 according to the present embodiment is disposed so as to be electrically connected to electrode portion 112a of first input/output line 112 at an upper-surface side (i.e., a rear-surface side) of first resonator 111.

The position at which first resonator 111 is electrically connected to electrode portion 112a of first input/output line 112 is appropriately set in consideration of impedance matching between first resonator 111 and first input/output line 112 (this will be described below with reference to FIG. 5A to FIG. 6C). Hereinafter, the position at which first resonator 111 is electrically connected to electrode portion 112a will be defined by angle $\angle A_1 A_0 A_2$ formed between a line connecting center point $A_0$ of first resonator 111 and position $A_2$ at which first resonator 111 is electrically connected to electrode portion 112a and a line connecting center point $A_0$ of first resonator 111 and center position $A_1$ in the longitudinal direction of first resonator 111 in plan view (i.e., the angle difference between position $A_2$ and position $A_1$ in a circumferential direction of first resonator 111). Hereinafter, this angle will be referred to as "port angle $\phi_A$".

First resonator 111 has, for example, on a side surface of first resonator 111, protruding portion 111b protruding from a center position in the longitudinal direction (i.e., a center position in the circumferential direction) of first resonator 111 toward center point $A_0$ of first resonator 111 (see FIG. 3). First resonator 111 is supported by support rod 111S disposed through protruding portion 111b and extending in an up-down direction (±Z direction). The position of protruding portion 111b typically corresponds to a zero cross point of a voltage at which first resonator 111 performs a resonance operation, and thus protruding portion 111b does not affect the resonance characteristic of first resonator 111 even in an electrical connection having conductivity.

First resonator 111 is disposed at a position facing first ground plate 113 that is disposed above (in the +Z direction) first resonator 111 so as to be separated from first ground plate 113. First resonator 111 is disposed so as to be located below circuit board 120a on which oscillator 120 is disposed, with first ground plate 113 interposed therebetween. First resonator 111 is supported and fixed by support rod 111S extending from a lower surface of circuit board 120a.

Support rod 111S is supported in a rotatable manner by a bearing (not illustrated) disposed in circuit board 120a. Support rod 111S is coupled to first driving section 115 (for example, a driving motor) via gear wheel 115a and rotates around the central axis of support rod 111S in accordance with an operation of first driving section 115. In other words, first resonator 111 is capable of rotating in the circumferential direction of first resonator 111 with center point $A_0$ of first resonator 111 being the rotation center, in accordance with the rotation of support rod 111S. Accordingly, the position at which first resonator 111 and electrode portion 112a are electrically connected to each other (i.e., port angle $\phi_A$) is adjustable. On a side surface of support rod 111S, a gear groove (not illustrated) that engages with gear wheel 115a of first driving section 115 is formed.

First input/output line 112 is disposed so as to be electrically connected to first resonator 111 and transmits the high-frequency power obtained from oscillator 120 to first resonator 111. First input/output line 112 is formed of, for example, a coaxial line extending downward (in the −Z direction) from the lower surface of circuit board 120a (for example, a printed circuit board (PCB)) on which oscillator 120 is disposed, so as to electrically connect first resonator 111 and oscillator 120. First input/output line 112 extends from the lower surface of circuit board 120a through a through hole formed in first ground plate 113 to immediately above the upper surface of first resonator 111.

Note that, when the distance between first resonator 111 and circuit board 120a is short, first input/output line 112 may be formed of, instead of a coaxial line, a metallic pin (for example, a connection pin of a diode constituting oscillator 120) protruding downward from circuit board 120a (oscillator 120). First input/output line 112 is typically adjusted so as to have a predetermined characteristic impedance (for example, 50Ω).

It is sufficient that circuit board 120a be located near (i.e., adjacent to) first resonator 111, for example, circuit board 120a may be located at a side-surface side of first resonator 111.

First input/output line 112 has electrode portion 112a at the lower end position thereof, and electrode portion 112a is disposed facing the upper surface of first resonator 111. Accordingly, first input/output line 112 is electrically connected to first resonator 111 via electrode portion 112a. Electrode portion 112a is, for example, a plate-like electrode connected to a central conductor of the coaxial line forming first input/output line 112. Electrode portion 112a is disposed, for example, so as to be in contact with the upper surface of first resonator 111, thereby being electrically connected to first resonator 111.

Note that electrode portion 112a may be disposed so as to be separated from first resonator 111 and may be electrically connected to first resonator 111 by capacitive coupling (see Embodiment 2 described below).

Electrode portion 112a may have any shape, for example, has a circular shape in plan view. Desirably, electrode portion 112a does not protrude toward center point $A_0$ from a side portion on an internal diameter side of first resonator 111 in plan view so as to suppress a change in resonant frequency resulting from a change in effective ring size.

First ground plate 113 is disposed above (in the +Z direction) first resonator 111 so as to face and be separated from first resonator 111. At a center of first ground plate 113, a through hole through which support rod 111S extends is formed.

A space between first ground plate 113 and first resonator 111 serves as an air layer to form a microstrip line. Alternatively, a dielectric body other than the air layer may be present between first ground plate 113 and first resonator 111.

First control section 114 provides an execution instruction or the like to oscillator 120 to transmit power of a desired power value.

First control section 114 controls first driving section 115 while causing transmission and reception of high-frequency power to be performed between first resonator 111 and second resonator 211. First control section 114 sets port angle $\phi_A$ of first input/output line 112 with respect to first resonator 111 on the basis of power values of the power transmitted from first resonator 111 to second resonator 211, the power values being detected at individual positions of first resonator 111 (this will be described below with reference to FIG. 7). At this time, first control section 114 instructs second control section 214 to perform control so that port angle $\phi_B$ of second input/output line 212 with respect to second resonator 211 is the same as port angle $\phi_A$.

First control section 114 mainly includes, for example, a well-known microcomputer formed of a central processing unit (CPU), a read only memory (ROM), a random access memory (RAM), and the like, and also includes a communication controller or the like for wirelessly communicating with second control section 214.

First driving section 115 rotates first resonator 111 within a plane formed by first resonator 111 (i.e., a closed-curve line that is partially opened), that is, within an XY plane, with center point $A_0$ of first resonator 111 being the rotation center, thereby changing port angle $\phi_A$ of first input/output line 112 with respect to first resonator 111.

First driving section 115 is, for example, a driving motor having gear wheel 115a at its end and rotates gear wheel 115a to rotate support rod 111S, thereby rotating first resonator 111. The position of electrode portion 112a of first input/output line 112 is constantly fixed, and thus the positional relationship between first resonator 111 and electrode portion 112a relatively changes as a result of rotation of first resonator 111. In other words, as a result of rotating first resonator 111, port angle $\phi_A$ of first input/output line 112 with respect to first resonator 111 changes.

Second resonance apparatus 210 includes second resonator 211, second input/output line 212, second ground plate 213, second control section 214, and second driving section 215.

Second resonator 211, second input/output line 212, second ground plate 213, second control section 214, and second driving section 215 of second resonance apparatus 210 have configurations similar to those of first resonator 111, first input/output line 112, first ground plate 113, first control section 114, and first driving section 115 of first resonance apparatus 110, respectively.

Second resonator 211 has a structure having opening portion 211a in a part of a closed-curve line. Second resonator 211 is formed of, for example, a ring-shaped metallic plate having opening portion 211a. The length of the open ring of second resonator 211 is set to, for example, about ½ of the wavelength of high-frequency power to be transmitted and received, such that the both ends thereof, where a maximum potential difference is obtained, are close to each other. Typically, resonators of substantially the same size are used as first resonator 111 and second resonator 211 so that both the resonators have the same resonant frequency.

Second resonator 211 is disposed so as to be electrically connected to second input/output line 212, and transmits the high-frequency power received from first resonator 111 to rectifier circuit 220 via second input/output line 212. Second resonator 211 is disposed, for example, so as to be electrically connected to electrode portion 212a of second input/output line 212 at a lower-surface side of second resonator 211.

The position at which second resonator 211 is electrically connected to electrode portion 212a of second input/output line 212 is appropriately set so as to achieve impedance matching between second resonator 211 and second input/output line 212 (this will be described below with reference to FIG. 5A to FIG. 6C). Hereinafter, the position at which second resonator 211 is electrically connected to electrode portion 212a will be defined by angle $\angle B_1 B_0 B_2$ formed between a line connecting center point $B_0$ of second resonator 211 and position $B_2$ at which second resonator 211 is electrically connected to electrode portion 212a and a line connecting center point $B_0$ of second resonator 211 and center position $B_1$ in a longitudinal direction of second resonator 211 in plan view (i.e., the angle difference between position $B_2$ and position $B_1$ in a circumferential direction of second resonator 211). Hereinafter, this angle will be referred to as "port angle $\phi_B$". Port angle $\phi_B$ is typically set to be substantially the same as port angle $\phi_A$.

Similarly to first resonator 111, second resonator 211 has, on a side surface of second resonator 211, a protruding portion (not illustrated) protruding from a center position in the longitudinal direction (i.e., a center position in the circumferential direction) of second resonator 211 toward center point $B_0$ of second resonator 211. Second resonator 211 is supported by support rod 211S disposed through the protruding portion and extending in the up-down direction.

Second resonator 211 is disposed at a position facing second ground plate 213 that is disposed below (in the −Z direction) second resonator 211 so as to be separated from second ground plate 213. Second resonator 211 is disposed so as to be located above circuit board 220a on which rectifier circuit 220 is disposed, with second ground plate 213 interposed therebetween. Second resonator 211 is supported and fixed by support rod 211S extending from an upper surface of circuit board 220a.

Support rod 211S is supported in a rotatable manner by a bearing (not illustrated) disposed in circuit board 220a. Support rod 211S is coupled to second driving section 215 (for example, a driving motor) via gear wheel 215a and rotates around the central axis of support rod 211S in accordance with an operation of second driving section 215. In other words, second resonator 211 is capable of rotating in the circumferential direction of second resonator 211 with center point $B_0$ of second resonator 211 being the rotation center, in accordance with the rotation of support rod 211S. Accordingly, the position at which second resonator 211 and electrode portion 212a are electrically connected to each other (i.e., port angle $\phi_B$) is adjustable. On a side surface of support rod 211S, a gear groove (not illustrated) that engages with gear wheel 215a of second driving section 215 is formed.

Second input/output line 212 transmits the high-frequency power received by second resonator 211 to rectifier circuit 220. Second input/output line 212 is formed of, for example, a coaxial line extending in the up-down direction so as to electrically connect second resonator 211 and rectifier circuit 220. Second input/output line 212 extends from the upper surface of circuit board 220a which is disposed below second ground plate 213 and on which rectifier circuit 220 is disposed, through a through hole formed in second ground plate 213 to immediately below a lower surface of second resonator 211. Second input/output line 212 is typically adjusted so as to have a predetermined characteristic impedance (for example, 50Ω).

Second input/output line 212 has electrode portion 212a at the upper end position thereof, and electrode portion 212a is disposed facing the lower surface of second resonator 211. Accordingly, second input/output line 212 is electrically connected to second resonator 211 via electrode portion 212a. Electrode portion 212a is, for example, a plate-like electrode connected to a central conductor of the coaxial line forming second input/output line 212. Electrode portion 212a is disposed, for example, so as to be in contact with the lower surface of second resonator 211, thereby being electrically connected to second resonator 211. Electrode portion 212a may have any shape, for example, has a circular shape in plan view.

Second ground plate 213 is disposed below (in the −Z direction) second resonator 211 so as to face second resonator 211.

Second control section 214 communicates with first control section 114 and controls the driving of second driving section 215.

Second control section 214 mainly includes, for example, a well-known microcomputer formed of a CPU, a ROM, a RAM, and the like, and also includes a communication controller or the like for wirelessly communicating with first control section 114. Second control section 214 obtains a sensor signal from current sensor 214a that detects the level of a current flowing through rectifier circuit 220 so as to be capable of measuring a transmission efficiency when transmission and reception of high-frequency power is performed between first resonator 111 and second resonator 211.

Second driving section 215 rotates second resonator 211 within a plane formed by second resonator 211 (i.e., a closed-curve line that is partially opened), that is, within the XY plane, with center point $B_0$ of second resonator 211 being the rotation center.

Second driving section 215 is, for example, a driving motor having gear wheel 215a at its end and rotates gear wheel 215a to rotate support rod 211S, thereby rotating second resonator 211. The position of electrode portion 212a of second input/output line 212 is constantly fixed, and thus the positional relationship between second resonator 211 and electrode portion 212a relatively changes as a result of rotation of second resonator 211. Accordingly, second driving section 215 changes port angle $\phi_B$ of second input/output line 212 with respect to second resonator 211.

When power transmission is performed in power transmission apparatus U, first resonator 111 and second resonator 211 are disposed facing each other such that the internal diameters thereof overlap each other (typically such that center point $A_0$ of first resonator 111 and center point $B_0$ of second resonator 211 overlap each other) in plan view (see FIG. 4). First resonator 111 and second resonator 211 are disposed facing each other with a space, a dielectric material, or both of them interposed therebetween.

At this time, first resonator 111 and second resonator 211 are disposed such that an angle formed between a line connecting opening portion 111a and center point $A_0$ of first resonator 111 and a line connecting opening portion 211a and center point $B_0$ of second resonator 211 in plan view (i.e., the angle difference between opening portion 111a of first resonator 111 and opening portion 211a of second resonator 211 in the circumferential direction of the rings, hereinafter referred to as "inter-ring angle α") is, for example, 90° or larger, more preferably 180°. In particular, when inter-ring angle α is 180°, both magnetic resonance and electric resonance are in the same phase between first resonator 111 and second resonator 211, the resonance intensity is the highest, and a transmission efficiency of about 100% can be achieved.

[Function of Adjusting Port Angle of Input/output Line with Respect to Resonator]

A description will be given of a function of adjusting port angles $\phi_A$ and $\phi_B$ in first and second resonance apparatuses 110 and 210 according to the present embodiment with reference to FIG. 5A to FIG. 6C.

As described above, in first resonance apparatus 110, port angle $\phi_A$ of first input/output line 112 with respect to first resonator 111 is adjustable. Also, in second resonance apparatus 210, port angle $\phi_B$ of second input/output line 212 with respect to second resonator 211 is adjustable. Typically, resonators having the same resonance characteristic are used as first resonator 111 and second resonator 211, and thus port angle $\phi_A$ of first input/output line 112 with respect to first resonator 111 and port angle $\phi_B$ of second input/output line 212 with respect to second resonator 211 are typically set to the same angle. Hereinafter, port angle $\phi_A$ and port angle $\phi_B$ will be referred to as "port angle $\phi$" when both are not particularly distinguished from each other.

Hereinafter, first resonance apparatus 110 and the components thereof will be abbreviated as "resonance apparatus 110", "resonator 111", "input/output line 112", and "control section 114", and second resonance apparatus 210 and the components thereof will be abbreviated as "resonance apparatus 210", "resonator 211", "input/output line 212", and "control section 214".

Figure 5A:
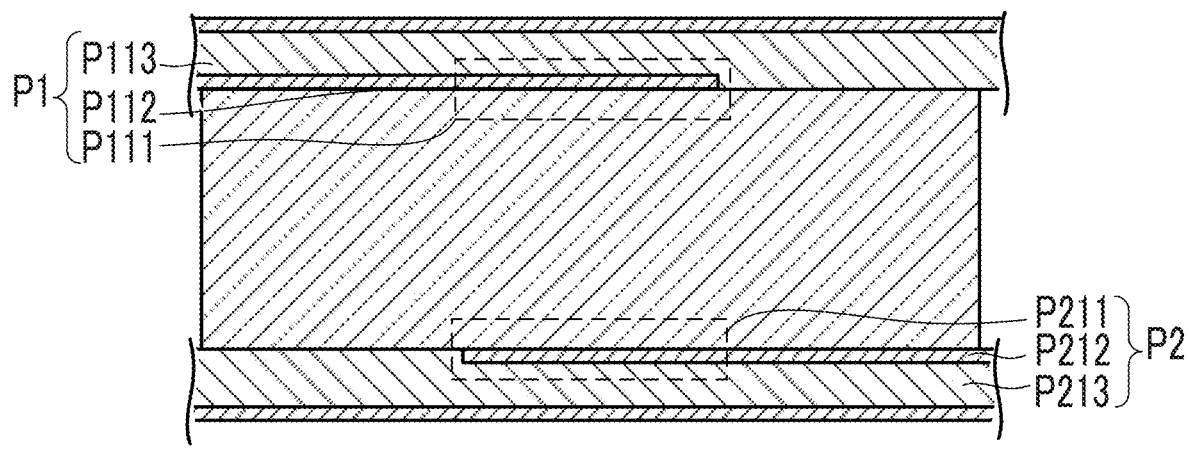
FIG. 5A is diagram illustrating an example of a connection state between resonators and input/output lines in resonance apparatuses according to the related art.
Figure 5B:
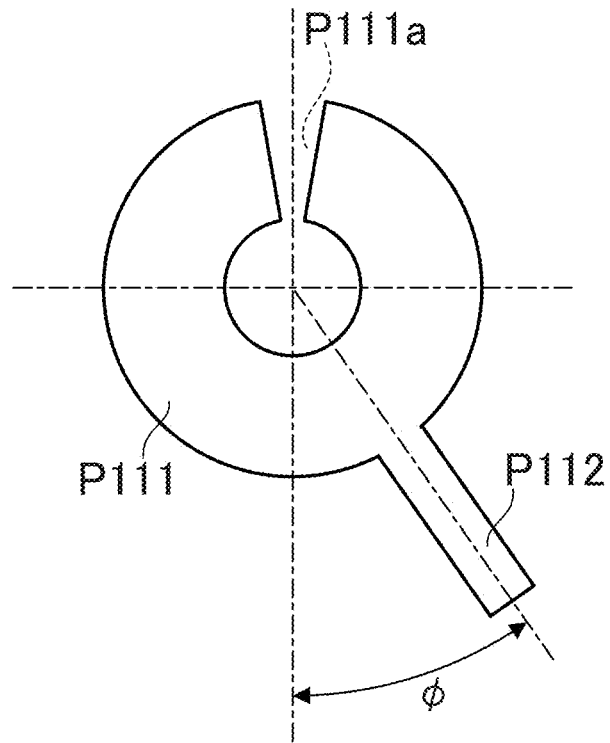
FIG. 5B is a diagram illustrating an example of a connection state between a resonator and an input/output line in a resonance apparatus according to the related art.

FIG. 5A and FIG. 5B are diagrams illustrating an example of a connection state between resonators P111 and P211 and input/output lines P112 and P212 in resonance apparatuses P1 and P2 according to the related art. FIG. 5A is a cross-sectional side view of resonator P111 and resonator P211. FIG. 5B is a plan view of resonance apparatus P1.

In resonance apparatuses P1 and P2 according to the related art, as illustrated in FIG. 5A and FIG. 5B, resonator P111 is disposed in circuit board P113 together with input/output line P112 and is formed of a conductor pattern extending from input/output line P112. Also, resonator P211 is disposed in circuit board P213 together with input/output line P212 and is formed of a conductor pattern extending from input/output line P212.

The frequency characteristic related to the transmittance when transmission and reception of high-frequency power is performed between resonator P111 and resonator P211 is that, when the two resonators are close to each other, resonant frequency f0 unique to the resonators (hereinafter referred to as fundamental-mode frequency f0) is separated into two resonant frequencies, high-frequency-side resonant frequency f1 and low-frequency-side resonant frequency f2, because of electromagnetic coupling between resonator P111 and resonator P211 (see FIG. 6A). As the coupling strength between the two resonators increases, high-frequency-side resonant frequency f1 and low-frequency-side resonant frequency f2 shift in the direction away from fundamental-mode frequency f0.

The state of electromagnetic coupling between the resonators is generally expressed as coupling coefficient k by the following equation 1.

[1]
$$k = \frac{2(f_2 - f_1)}{f_2 + f_1} \quad (1)$$

Note that, within the band between high-frequency-side resonant frequency f1 and low-frequency-side resonant frequency f2, a uniform transmission efficiency (transmittance) is not necessarily achieved, but the transmission efficiency in an intermediate region of the frequency band decreases in general (a double-humped frequency characteristic).

Thus, in resonance apparatuses P1 and P2 according to the related art, port angle $\phi$ of input/output line P112 with respect to resonator P111 is appropriately set to change the input impedance of resonator P111 (or the output impedance of resonator P111), that is, the external Q value, and accordingly impedance matching is achieved between input/output line P112 and resonator P111. Accordingly, the frequency characteristic related to the transmittance when transmission and reception of high-frequency power is performed between resonance apparatus P1 and resonance apparatus P2 can be changed from double-humped to maximally flat (see, for example, PTL 1 or NPL 1).

As port angle $\phi$ of input/output line P112 with respect to resonator P111 increases, input and output of signals increase, and the input impedance (typically the reactance component) of resonator P111 and the external Q value decrease. On the other hand, as port angle $\phi$ becomes closer to 0°, the input impedance (typically the reactance component) of resonator P111 and the external Q value increase.

However, the input impedance of resonator P111 and the output impedance of resonator P211 (i.e., impedance matching conditions) that are appropriate for changing the frequency characteristic related to the transmittance from double-humped to maximally flat actually change in accordance with the state of electromagnetic coupling between resonator P111 and resonator P211, for example, change in accordance with the distance between resonator P111 and resonator P211 or the permittivity or the like of a medium between resonator P111 and resonator P211. Thus, in a state in which port angle $\phi$ is fixed as in resonance apparatus P1 according to the related art, it may be impossible to change the frequency characteristic related to the transmittance from double-humped to maximally flat.

From this point of view, resonance apparatuses 110 and 210 according to the present embodiment adopt a support structure capable of adjusting port angle $\phi$. Resonance apparatuses 110 and 210 change port angle $\phi$ in accordance with a change in the state of electromagnetic coupling between resonator 111 and resonator 211. Accordingly, it is possible to change the frequency characteristic related to the transmittance during power transmission from double-humped to maximally flat.

Figure 6A:
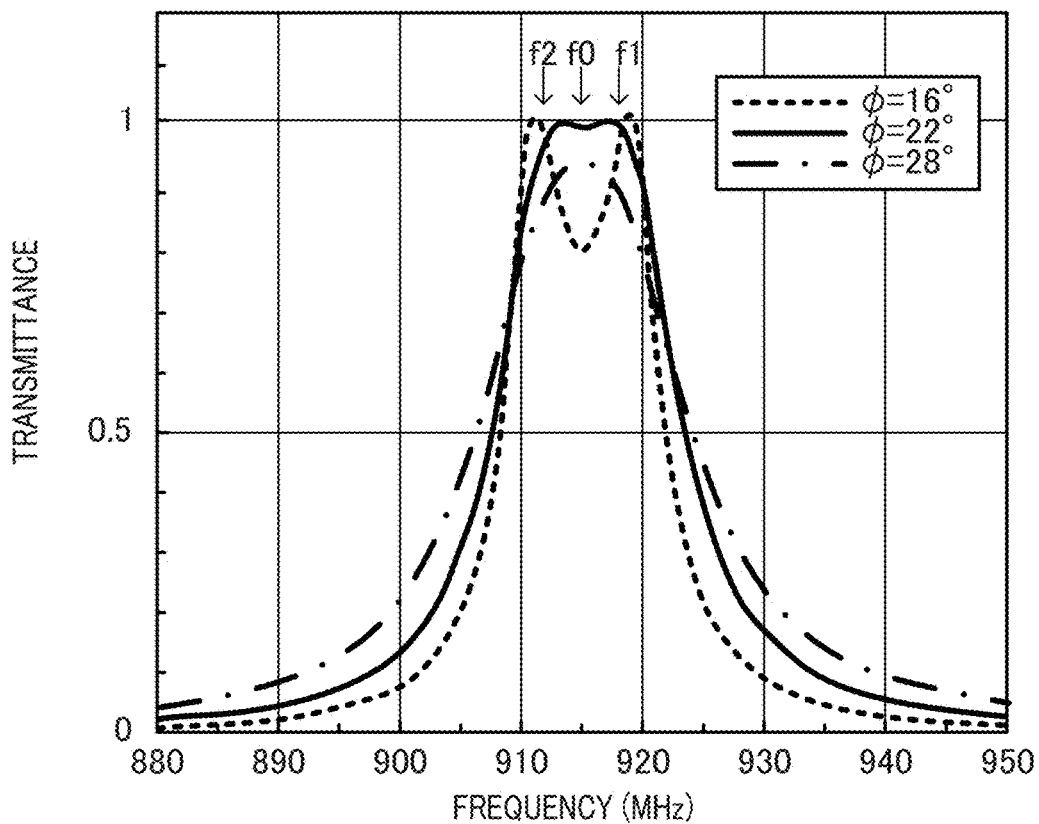
FIG. 6A is a graph illustrating an example of the relationship between port angles and transmittances in the power transmission apparatus according to Embodiment 1.
Figure 6B:
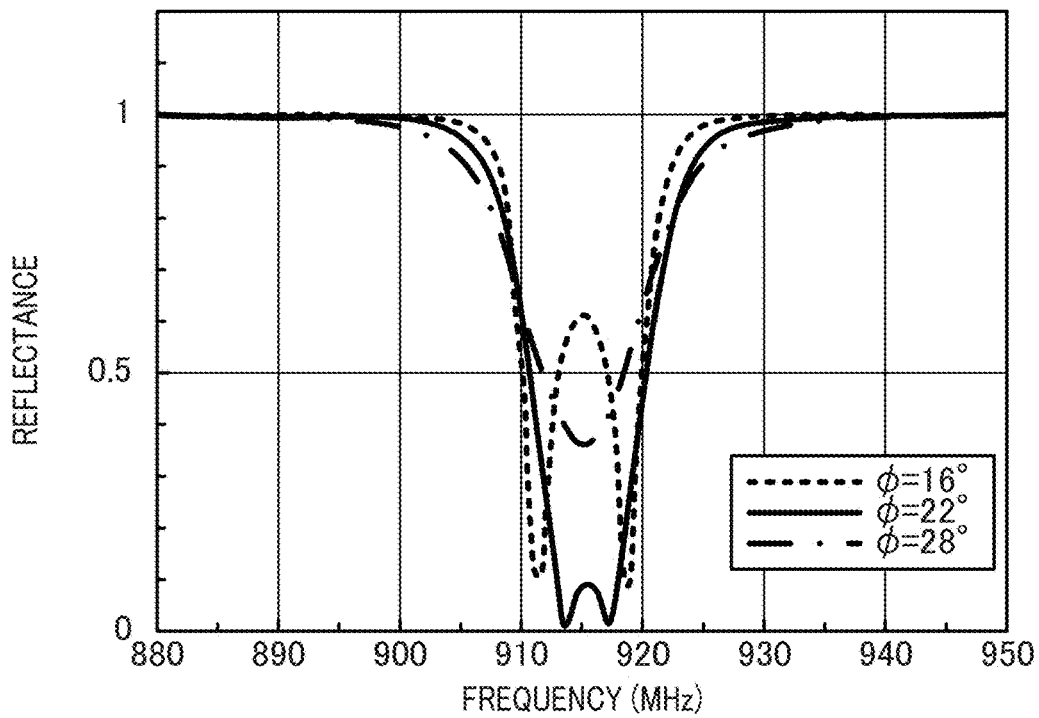
FIG. 6B is a graph illustrating an example of the relationship between port angles and reflectances in the power transmission apparatus according to Embodiment 1.
Figure 6C:
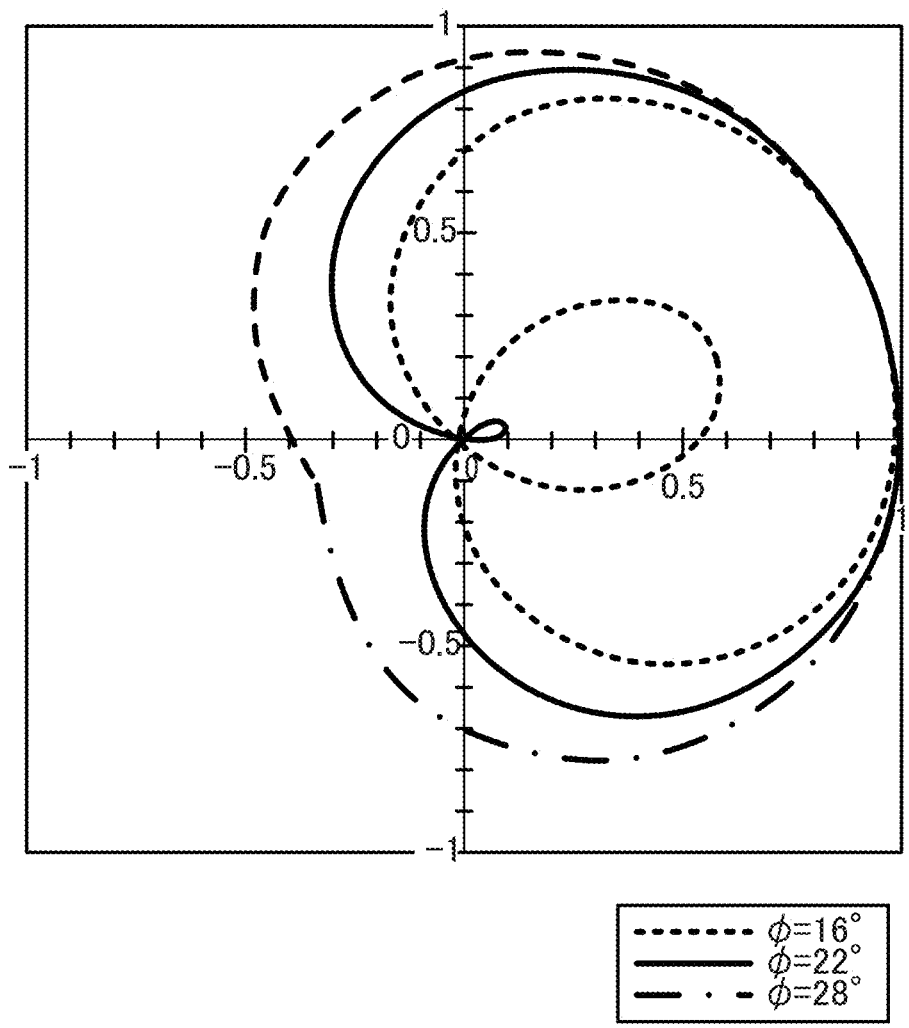
FIG. 6C is a diagram illustrating an example of a Smith chart of port angles and reflection characteristics in the power transmission apparatus according to Embodiment 1.

FIG. 6A to FIG. 6C are graphs illustrating an example of the relationship between port angle $\phi$ and a transmission characteristic or a reflection characteristic in power transmission apparatus U according to the present embodiment.

FIG. 6A to FIG. 6C each illustrate a result of a simulation of calculating, with an electromagnetic-field analysis simulation, a transmission characteristic or a reflection characteristic observed when high-frequency power is transmitted from resonance apparatus 110 to resonance apparatus 210. FIG. 6A illustrates transmittances (S21), FIG. 6B illustrates reflectances (S11), and FIG. 6C illustrates the reflectances in FIG. 6B in the form of a Smith chart.

The individual lines in the graph in each of FIG. 6A to FIG. 6C represent transmittances or reflectances in the following conditions.

Broken line: the condition in which port angle $\phi$ is set to 16°
Solid line: the condition in which port angle $\phi$ is set to 22°
One-dot chain line: the condition in which port angle $\phi$ is set to 28°

Specific conditions of the simulation are as follows. Glass substrate T having a relative permittivity of 3.9 and a thickness of 25 mm is disposed between resonator 111 and resonator 211. The shape of each of resonator 111 and resonator 211 is an open ring having an internal diameter of 9.3 mm and an external diameter of 19.3 mm. Each of input/output line 112 and input/output line 212 is a microstrip line having a characteristic impedance of 50Ω and a width of 2 mm.

As is understood from FIG. 6A, when port angle $\phi$ is 22°, the transmission characteristic is a substantially maximally flat frequency characteristic with a 3 dB bandwidth of 15.8 MHz, with 915 MHz being the center (solid line). When port angle $\phi$ is 16°, impedance matching is lost because the input impedance of resonator 111 increases, and the transmission characteristic changes to a double-humped frequency characteristic in which fundamental-mode frequency f0 at the peak position is separated into high-frequency-side frequency f1 and low-frequency-side frequency f2 (broken line). On the other hand, when port angle ϕ is 28°, the input impedance of resonator 111 extremely decreases, and thus the transmission characteristic changes to a frequency characteristic having one peak at fundamental-mode frequency f0 (one-dot chain line). The reflectance in FIG. 6B represents an inverted characteristic of the transmittance in FIG. 6A.

As is understood from FIG. 6C, when port angle ϕ is 22°, a loop is substantially at the origin and the reflectance is low in the Smith chart (solid line). On the other hand, when port angle ϕ is 16°, a loop is on the right side of the origin, and the curve passes near the origin twice (broken line). This indicates that, when port angle ϕ is 16°, there are two frequencies at which the reflectance is low, and accordingly two peaks occur in the transmittance. On the other hand, when port angle ϕ is 28°, the curve passes near the origin without forming a loop. This indicates that the reflectance decreases only once and as a result there is one peak of transmittance (one-dot chain line).

Figure 7:
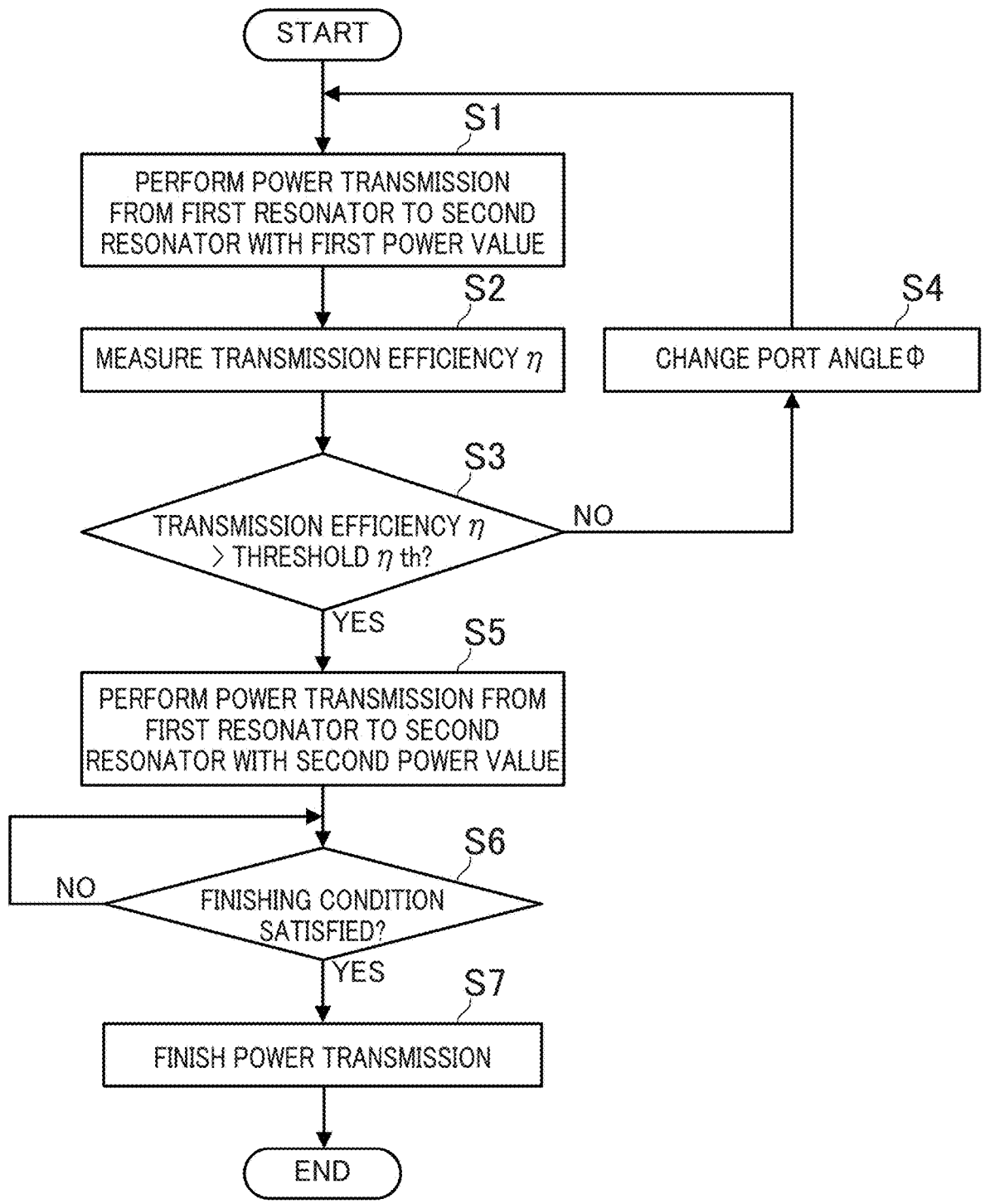
FIG. 7 is a flowchart illustrating an example of an operation of the power transmission apparatus according to Embodiment 1.

FIG. 7 is a flowchart illustrating an example of an operation of power transmission apparatus U according to the present embodiment. The flowchart illustrated in FIG. 7 includes, for example, the steps sequentially executed by control section 114 in cooperation with control section 214 in accordance with a computer program.

In step S1, control section 114 controls oscillator 120 to cause power transmission from resonator 111 to resonator 211 to be performed with a first power value.

Step S1 is the step of experimental power transmission for specifying port angle ϕ that can ensure high transmission efficiency η. Thus, the first power value designated in step S1 is set to a power value lower than a power value used for power transmission according to the present embodiment in step S5 (second power value).

In step S2, control section 114 measures transmission efficiency η. At this time, for example, control section 114 obtains a detection signal of current sensor 214a from control section 214 and detects a power value of the power transmitted from resonator 111 to resonator 211. Subsequently, control section 114 compares the detected power value with the first power value indicated in the instruction to oscillator 120, thereby measuring transmission efficiency η.

In step S3, control section 114 determines whether or not transmission efficiency η measured in step S2 is higher than threshold $η_{th}$ (for example, 95%). If transmission efficiency η measured in step S2 is higher than threshold $η_{th}$ (YES in step S3), the process proceeds to step S5. If transmission efficiency η measured in step S2 is lower than or equal to threshold $η_{th}$ (NO in step S3), the process proceeds to step S4.

In step S3, control section 114 may determine port angle ϕ on the basis of the detected power value of the power transmitted from resonator 111 to resonator 211, instead of transmission efficiency η.

In step S4, control section 114 controls driving section 115 to rotate resonator 111 in the circumferential direction of resonator 111 by a predetermined angle (for example 1°). In other words, control section 114 changes port angle $ϕ_A$ of input/output line 112 with respect to resonator 111 by the predetermined angle (for example 1°). Subsequently, control section 114 instructs control section 214 to operate driving section 215 so that port angle $ϕ_B$ of input/output line 212 with respect to resonator 211 becomes the same as port angle $ϕ_A$ of input/output line 112 with respect to resonator 111.

Subsequently, the process returns to step S1, where control section 114 performs again power transmission and measurement of transmission efficiency η.

Steps S1 to S4 are repeatedly performed to specify port angle ϕ that can ensure high transmission efficiency η.

In step S5, control section 114 controls oscillator 120 to cause power transmission from resonator 111 to resonator 211 to be performed with a second power value. Step S5 corresponds to power transmission according to the present embodiment.

In step S6, control section 114 waits for a determination that a condition for finishing power transmission is satisfied (NO in step S6). If the finishing condition is satisfied (YES in step S6), the process proceeds to step S7. Control section 114 determines that the finishing condition is satisfied, for example, when the battery serving as electric load 230 reaches a fully charged state.

In step S7, control section 114 stops the operation of oscillator 120 to finish the power transmission.

Power transmission apparatus U is capable of performing power transmission from transmitting apparatus 100 to receiving apparatus 200 at high transmission efficiency η with the above-described series of steps.

[Advantages]

As described above, in resonance apparatuses 110 and 210 according to the present embodiment, the input impedance (or the output impedance) of a resonator can be adjusted by changing the positional relationship (here, port angle ϕ) between input/output lines 112 and 212 and resonators 111 and 211.

Accordingly, in accordance with the state of electromagnetic coupling between resonator 111 and resonator 211, the input impedance of resonator 111 (or the output impedance of resonator 211) can be adjusted and the frequency characteristic related to the transmittance can be changed from double-humped to maximally flat.

Embodiment 2

Next, an example of the configurations of resonance apparatuses 110 and 210 according to Embodiment 2 will be described with reference to FIG. 8 to FIG. 13B.

Figure 8:
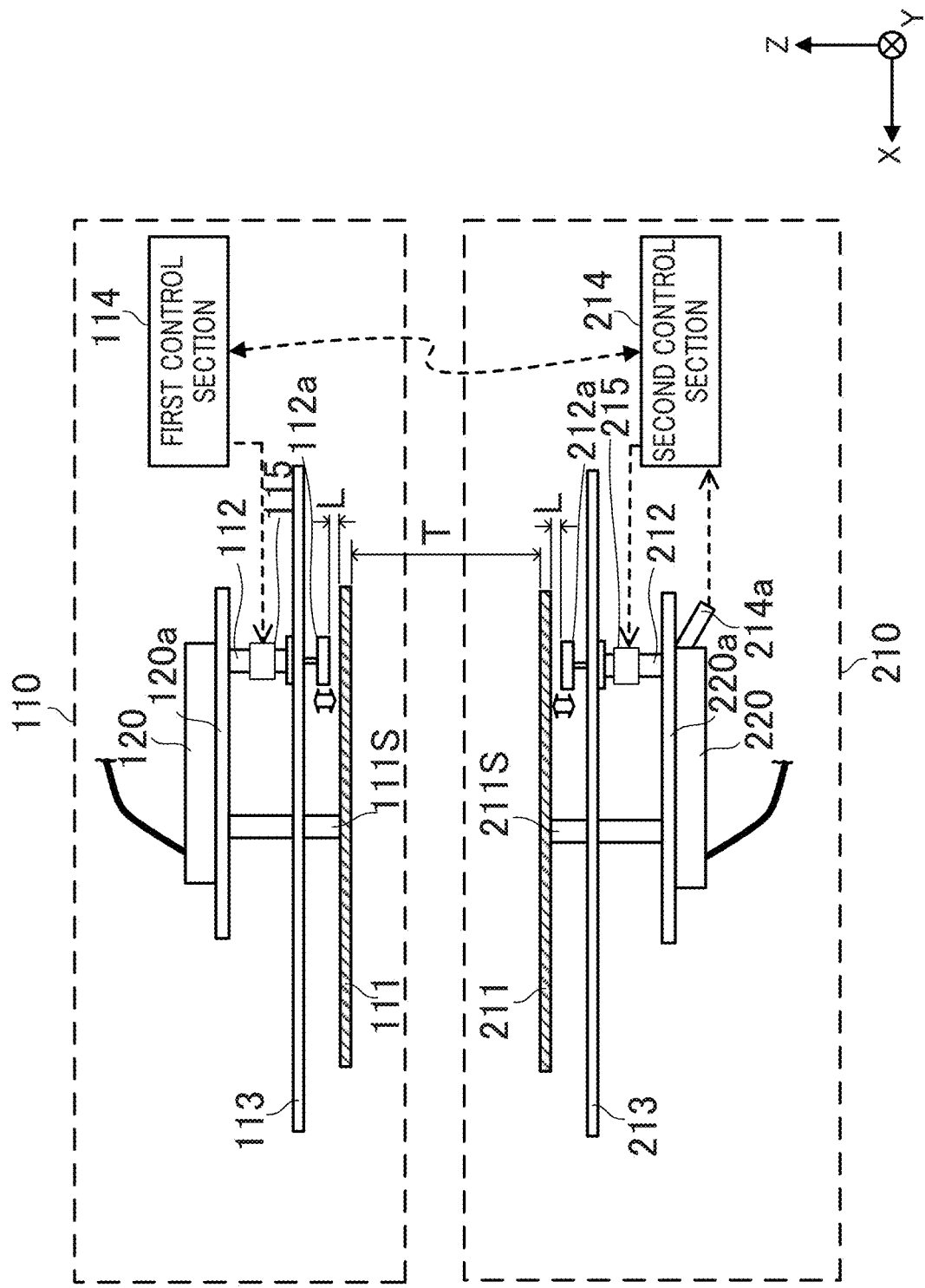
FIG. 8 is side view illustrating an example of the configurations of resonance apparatuses according to Embodiment 2.

FIG. 8 is a diagram illustrating an example of the configurations of resonance apparatuses 110 and 210 according to Embodiment 2.

Resonance apparatuses 110 and 210 according to the present embodiment are different from those of Embodiment 1 in being configured to electrically connect input/output lines 112 and 212 (electrode portions 112a and 212a) and resonators 111 and 211 by capacitive coupling and in that the capacitance formed between input/output lines 112 and 212 and resonators 111 and 211 is adjustable. The same configuration as that of Embodiment 1 is not described.

In the present embodiment, under the assumption that resonance apparatus 110 and resonance apparatus 210 have configurations similar to each other, only the configuration of resonance apparatus 110 will be described.

Electrode portion 112a of input/output line 112 according to the present embodiment is disposed at a position above resonator 111 and facing resonator 111 so as to be separated from the upper surface of resonator 111. In other words, resonator 111 and electrode portion 112a are disposed in a noncontact state. The shape of electrode portion 112a is, for example, circular in plan view as in Embodiment 1.

Resonance apparatus 110 according to the present embodiment is configured such that the distance between resonator 111 and electrode portion 112a (indicated by L in FIG. 8, hereinafter referred to as "electrode-resonator distance L") is adjustable. Specifically, input/output line 112 includes therein an adjustment mechanism (for example, a screwdriver-type length adjustment mechanism) that enables the support position of electrode portion 112a to be moved up or down (±Z direction), and the adjustment mechanism is operated by driving section 115.

Specifically, in resonance apparatus 110 according to the present embodiment, electrode-resonator distance L is adjusted to adjust the capacitance formed between resonator 111 and electrode portion 112a. Accordingly, it becomes possible to adjust the input impedance of resonator 111 and change the frequency characteristic related to the transmittance from double-humped to maximally flat.

In the present embodiment, electrode-resonator distance L in resonance apparatus 110 and electrode-resonator distance L in resonance apparatus 210 are typically set to be substantially the same.

First, a description will be given of the frequency characteristic of a transmittance and a reflectance when the capacitance formed between input/output lines 112 and 212 and resonators 111 and 211 is adjusted in power transmission apparatus U according to the present embodiment with reference to FIG. 9 to FIG. 11.

Figure 9:
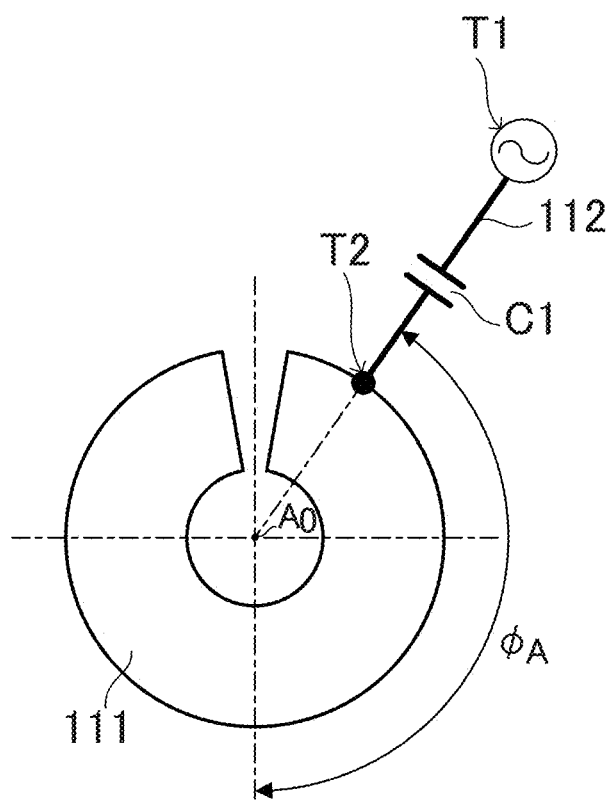
FIG. 9 is a model diagram schematically illustrating a resonance apparatus according to Embodiment 2.

FIG. 9 is a model diagram schematically illustrating the configuration of resonance apparatus 110 according to the present embodiment. FIG. 10 and FIG. 11 illustrate the results of simulations of calculating a transmittance (S21) and a reflectance (S11) when power transmission is performed in power transmission apparatus U using the model diagram in FIG. 9.

Resonance apparatus 110 in FIG. 9 has the same configuration as that of resonance apparatus 110 according to Embodiment 1 except that capacitance C1 is interposed between resonator 111 and input/output line 112. In this simulation, a simulation using electromagnetic-field analysis is performed on transmission and reception of high-frequency power between resonator 111 and resonator 211, whereas a simulation using circuit analysis is performed on transmission and reception of high-frequency power between signal source T1 and port position T2.

Figure 10:
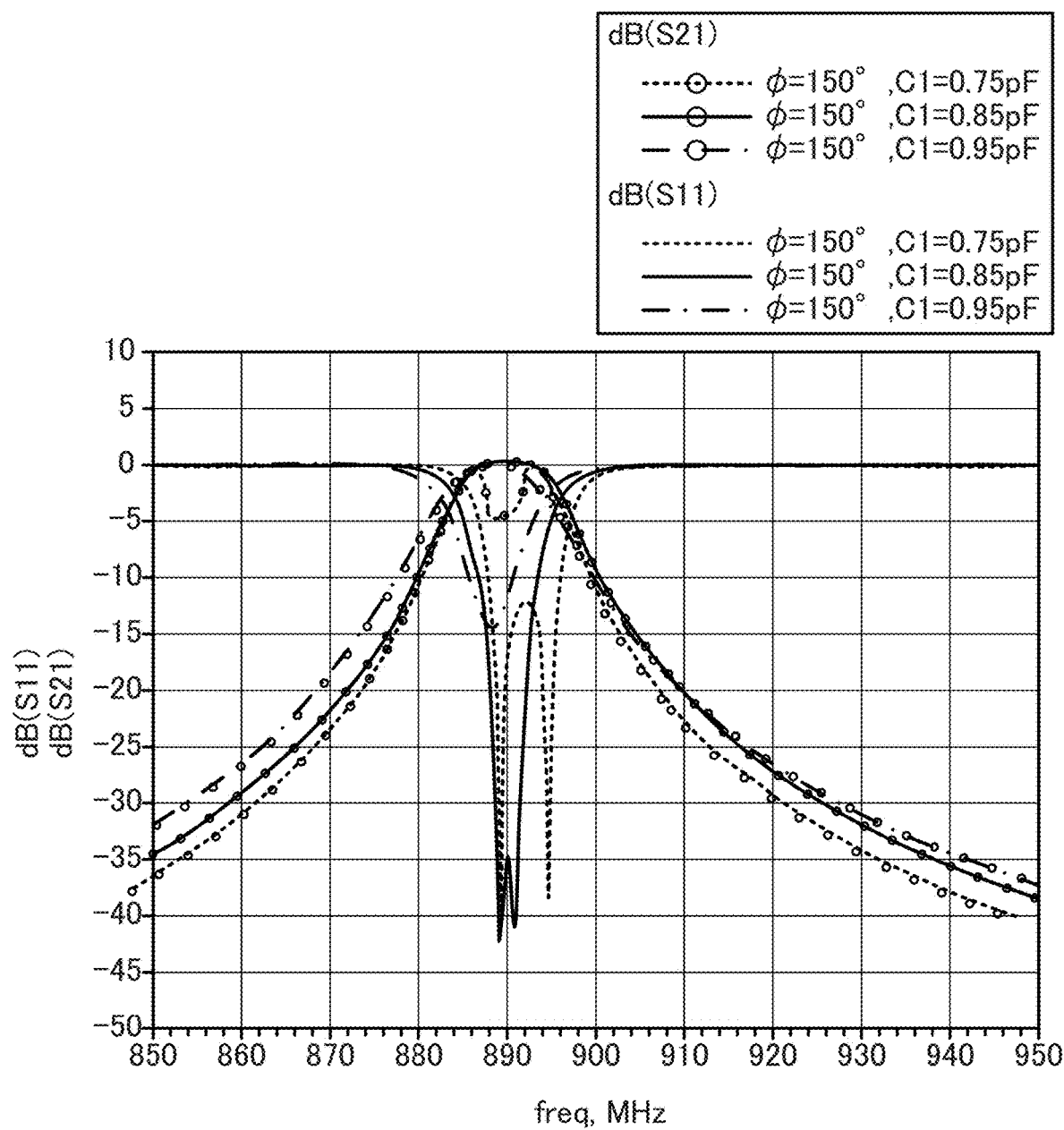
FIG. 10 illustrates a result of a simulation of calculating transmittances (S21) and reflectances (S11) when power transmission is performed in the power transmission apparatus using the model diagram in FIG. 9.

FIG. 10 illustrates transmittances (S21) and reflectances (S11) when capacitance C1 is changed in the model of resonance apparatus 110 in FIG. 9. In this simulation, port angle φ of input/output line 112 with respect to resonator 111 is set to 150°.

The individual lines in the graph in FIG. 10 represent the transmittances and reflectances in the following conditions. Circles are attached to the lines representing the transmittances.

Broken line: the condition in which capacitance C1 is set to 0.75 pF
Solid line: the condition in which capacitance C1 is set to 0.85 pF
One-dot chain line: the condition in which capacitance C1 is set to 0.95 pF As is understood from FIG. 10, the frequency characteristic related to the transmittance is maximally flat when capacitance C1 is 0.85 pF, double-humped when capacitance C1 is 0.75 pF, and single-humped when capacitance C1 is 0.95 pF.

Figure 11:
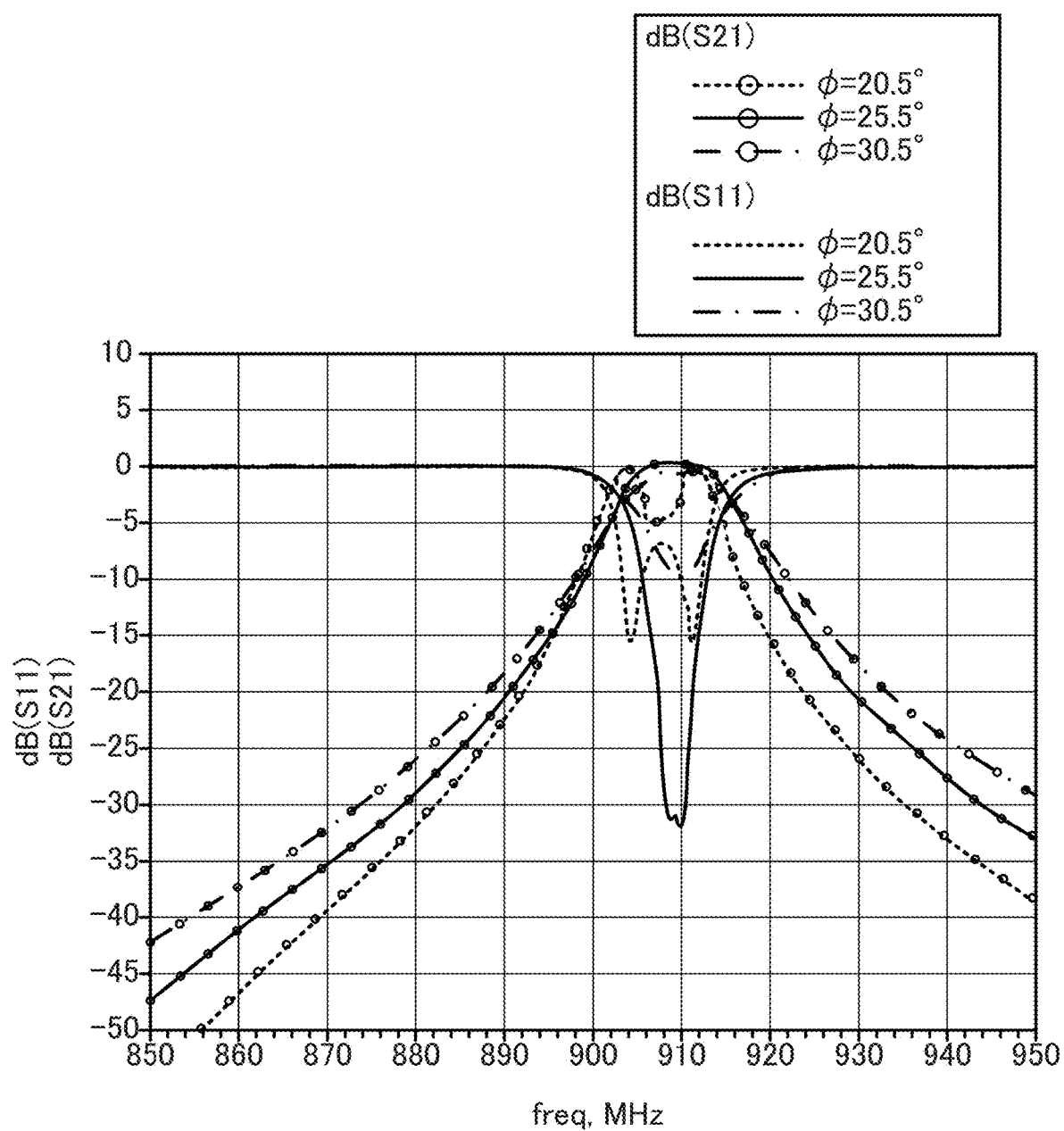
FIG. 11 illustrates a result of a simulation of calculating transmittances (S21) and reflectances (S11) when power transmission is performed in the power transmission apparatus using the model diagram in FIG. 9.

FIG. 11 illustrates, in comparison with FIG. 10, transmittances (S21) and reflectances (S11) when port angle φ of input/output line 112 with respect to resonator 111 is changed instead of capacitance C1 in the model of resonance apparatus 110 in FIG. 9. In this simulation, there is no capacitance C1, and resonator 111 and input/output line 112 are directly connected.

The individual lines in the graph in FIG. 11 represent the transmittances and reflectances in the following conditions. Circles are attached to the lines representing the transmittances.

Broken line: the condition in which port angle φ is set to 20.5°
Solid line: the condition in which port angle φ is set to 25.5°
One-dot chain line: the condition in which port angle φ is set to 30.5°

As is understood from FIG. 11, the frequency characteristic related to the transmittance is maximally flat when port angle φ is 25.5°, double-humped when port angle φ is 20.5°, and single-humped when port angle φ is 30.5°.

The comparison between FIG. 10 and FIG. 11 leads to the understanding that changing of port angle φ of input/output line 112 with respect to resonator 111 is equivalent to changing of the capacitance between input/output line 112 and resonator 111 as a mode of adjusting the input impedance of resonator 111.

Next, a description will be given of the frequency characteristic related to the transmittance when electrode-resonator distance L is changed in resonance apparatuses 110 and 210 according to the present embodiment.

Figure 12A:
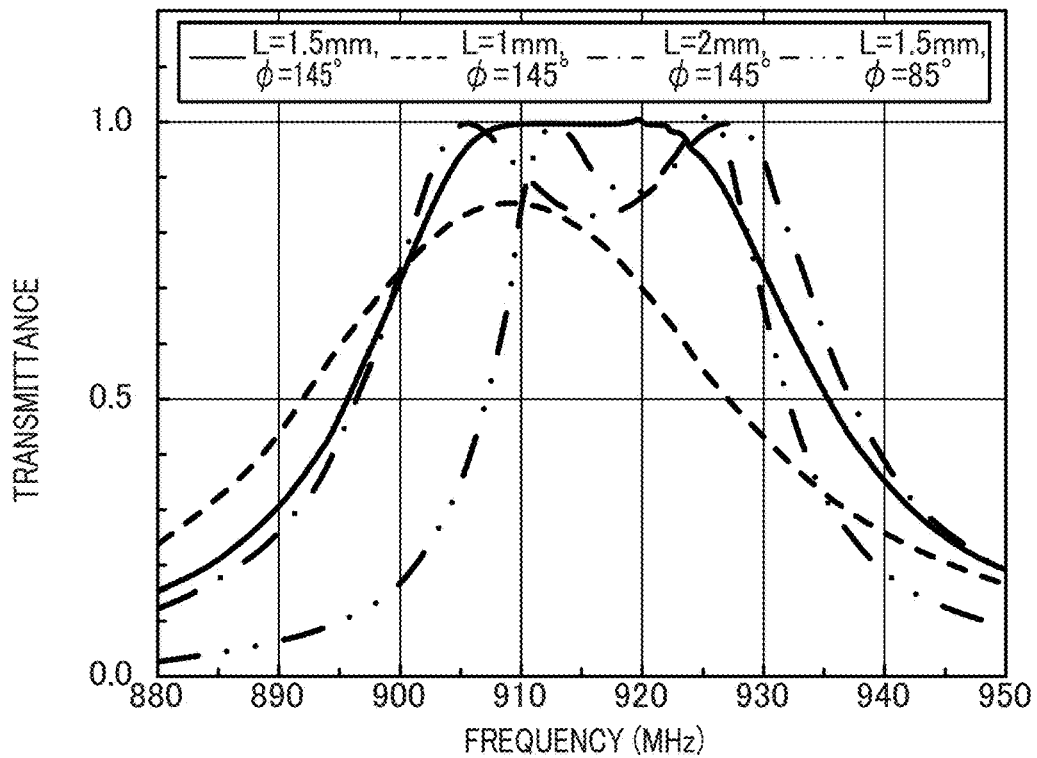
FIG. 12A illustrates a result of a simulation of calculating, with an electromagnetic-field analysis simulation, a transmission characteristic observed when high-frequency power is transmitted in the power transmission apparatus according to Embodiment 2.
Figure 12B:
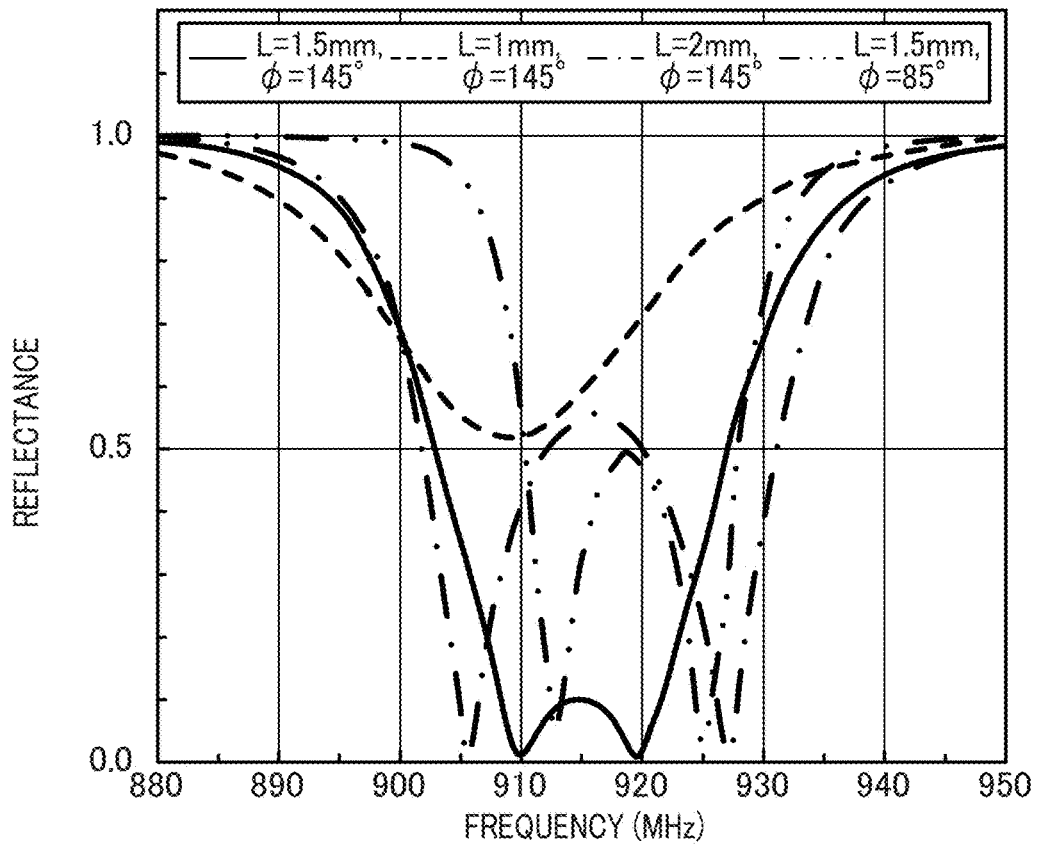
FIG. 12B illustrates a result of a simulation of calculating, with an electromagnetic-field analysis simulation, a reflection characteristic observed when high-frequency power is transmitted in the power transmission apparatus according to Embodiment 2.
Figure 12C:
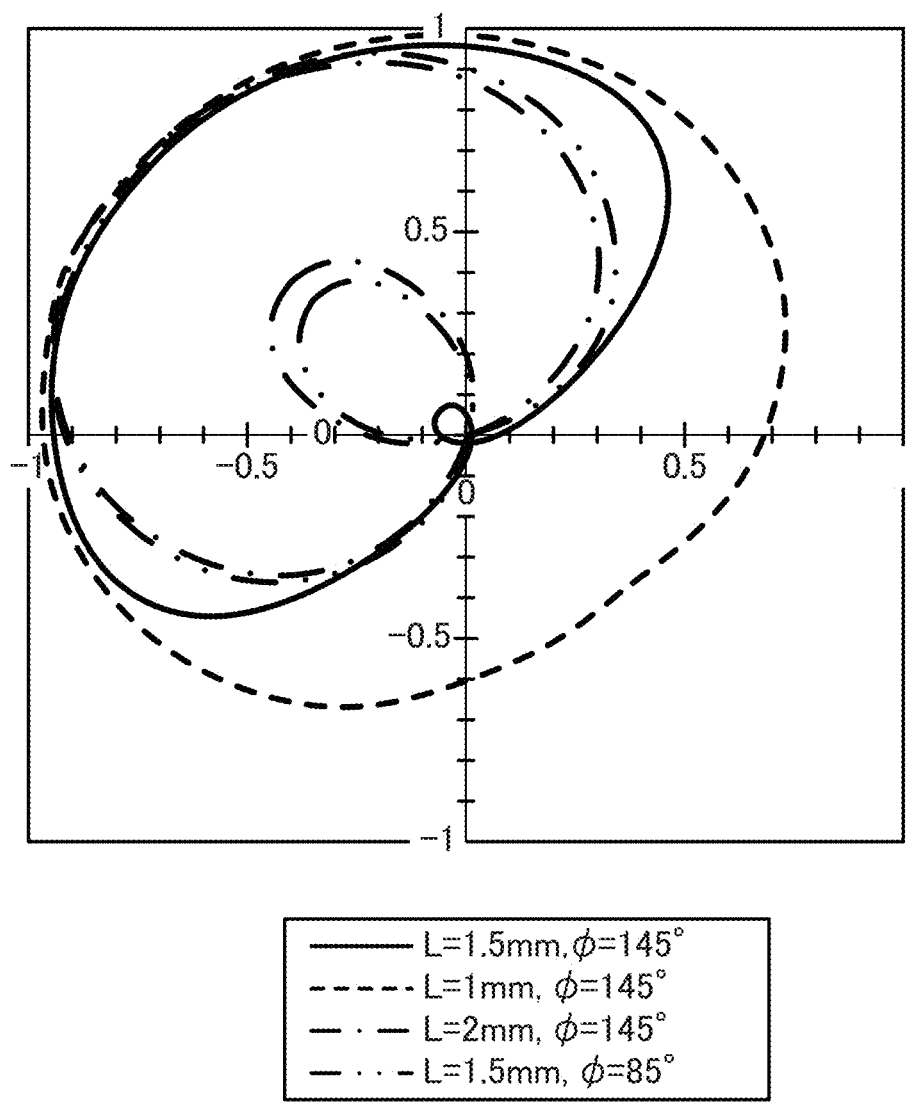
FIG. 12C illustrates a result of a simulation of calculating, with an electromagnetic-field analysis simulation, a reflection characteristic observed when high-frequency power is transmitted in the power transmission apparatus according to Embodiment 2.

FIG. 12A to FIG. 12C each illustrate a result of a simulation of calculating, with an electromagnetic-field analysis simulation, a transmission characteristic or a reflection characteristic observed when high-frequency power is transmitted in power transmission apparatus U according to the present embodiment.

FIG. 12A illustrates transmittances (S21), FIG. 12B illustrates reflectances (S11), and FIG. 12C illustrates the reflectances (S11) in FIG. 12B in the form of a Smith chart.

The individual lines in the graph in each of FIG. 12A to FIG. 12C represent transmittances or reflectances in the following conditions.

Solid line: the condition in which electrode-resonator distance L is set to 1.5 mm and port angle φ is set to 145°
Broken line: the condition in which electrode-resonator distance L is set to 1 mm and port angle φ is set to 145°
One-dot chain line: the condition in which electrode-resonator distance L is set to 2 mm and port angle φ is set to 145°
Two-dot chain line: the condition in which electrode-resonator distance L is set to 1.5 mm and port angle φ is set to 85°

Specific conditions of the simulation are similar to those of the electromagnetic-field analysis simulation illustrated in FIG. 6A to FIG. 6C.

In this simulation, changing of electrode-resonator distance L between 1 mm and 2 mm corresponds to changing of the capacitance between input/output line 112 and resonator 111 between 1.7 pF and 0.85 pF.

As is understood from FIG. 12A, when electrode-resonator distance L is 1.5 mm, impedance matching between input/output line 112 and resonator 111 is achieved, and the frequency characteristic related to the transmittance becomes maximally flat. When electrode-resonator distance L is decreased from 1.5 mm to 1.0 mm, the input impedance of resonator 111 decreases, and the frequency characteristic related to the transmittance becomes single-humped.

On the other hand, when electrode-resonator distance L is increased from 1.5 mm to 2 mm, the input impedance of resonator 111 increases, and the frequency characteristic related to the transmittance becomes double-humped. When port angle φ is decreased from 145° to 85° with electrode-resonator distance L being 1.5 mm, the input impedance of resonator 111 increases and thus the frequency characteristic related to the transmittance becomes double-humped.

Next, a description will be given of a change in the frequency characteristic related to the transmittance in a case where the distance between resonator 111 and resonator 211 (hereinafter referred to as "resonator-resonator distance T") is changed from 25 mm to 30 mm with reference to FIG. 13A and FIG. 13B.

Figure 13A:
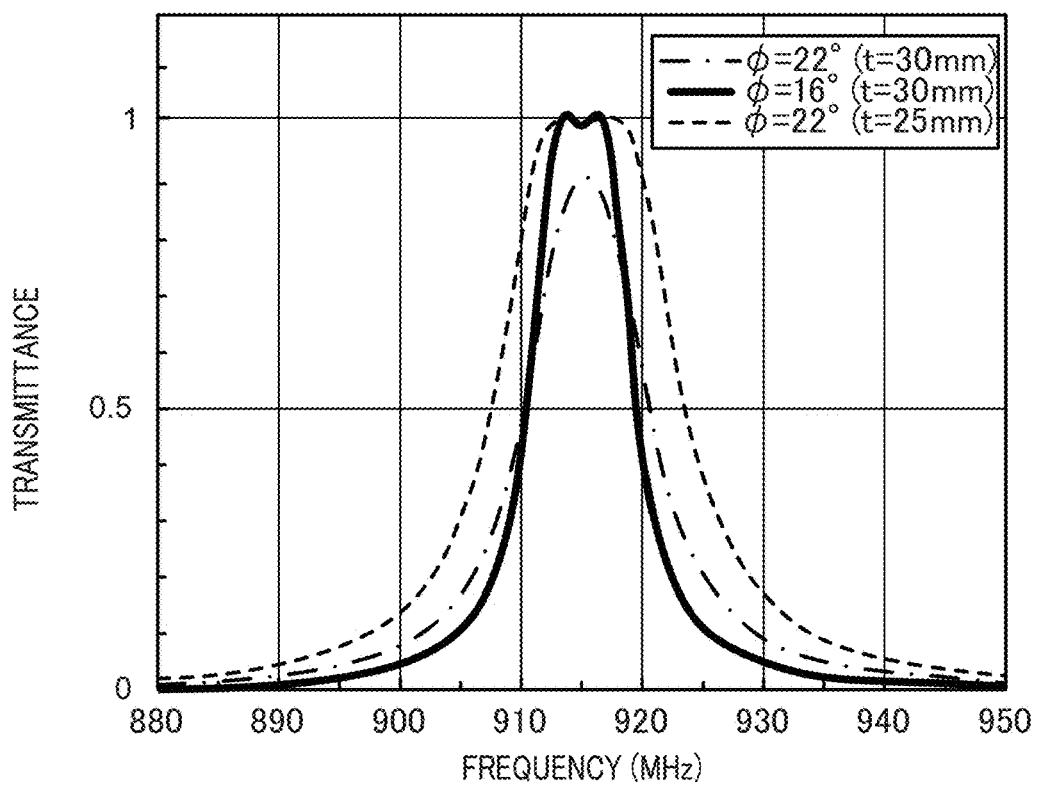
FIG. 13A is a graph illustrating a transmission characteristic observed when an input impedance of a resonator is adjusted by adjusting a port angle in a resonance apparatus according to Embodiment 1.

FIG. 13A is a graph illustrating a transmission characteristic observed when the input impedance of resonator 111 is adjusted by adjusting port angle φ in resonance apparatus 110 according to Embodiment 1.

Figure 13B:
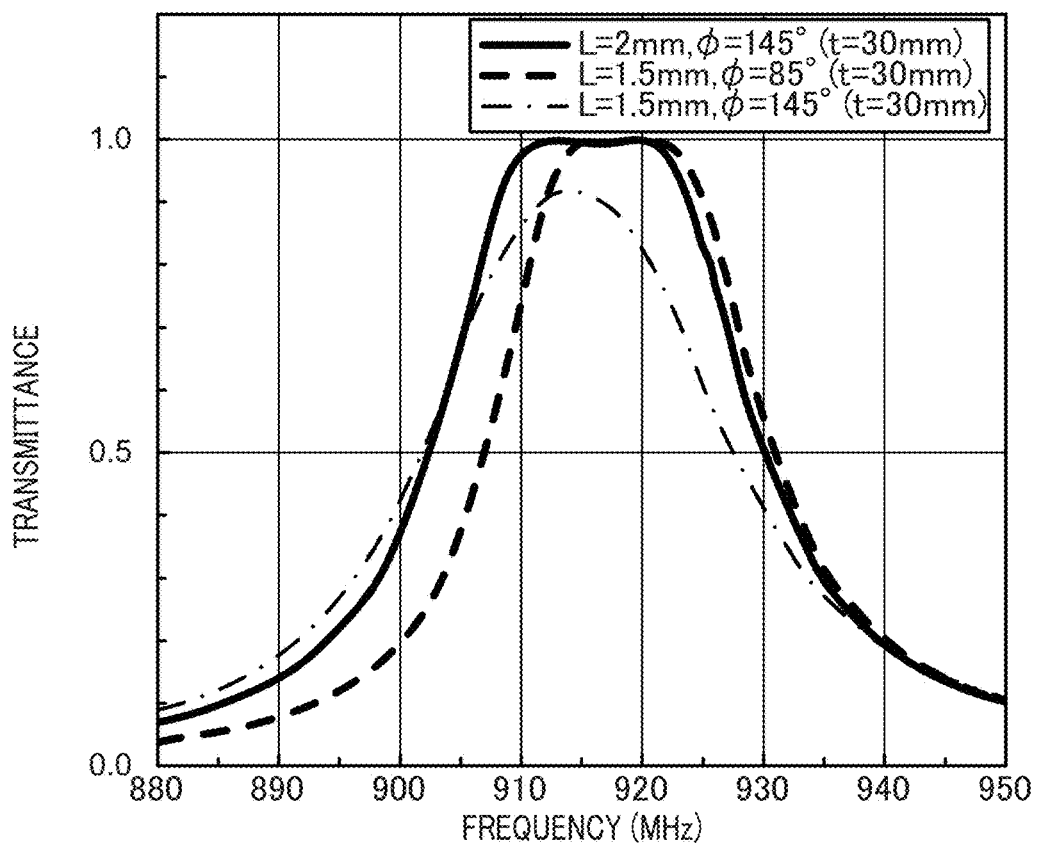
FIG. 13B is a graph illustrating a transmission characteristic observed when an input impedance of a resonator is adjusted by adjusting an electrode-resonator distance in a resonance apparatus according to Embodiment 2.

FIG. 13B is a graph illustrating a transmission characteristic observed when the input impedance of resonator 111 is adjusted by adjusting electrode-resonator distance L in resonance apparatus 110 according to Embodiment 2.

Both FIG. 13A and FIG. 13B illustrate a result of calculation in an electromagnetic-field analysis simulation.

The individual lines in the graph in FIG. 13A represent the transmittances in the following conditions.
Solid line: the condition in which port angle φ is set to 16° and resonator-resonator distance T is set to 30 mm
Broken line: the condition in which port angle φ is set to 22° and resonator-resonator distance T is set to 25 mm
One-dot chain line: the condition in which port angle φ is set to 22° and resonator-resonator distance T is set to 30 mm The individual lines in the graph in FIG. 13B represent the transmittances in the following conditions.
Solid line: the condition in which electrode-resonator distance L is set to 2 mm, port angle φ is set to 145°, and resonator-resonator distance T is set to 30 mm
Broken line: the condition in which electrode-resonator distance L is set to 1.5 mm, port angle φ is set to 85°, and resonator-resonator distance T is set to 30 mm
One-dot chain line: the condition in which electrode-resonator distance L is set to 1.5 mm, port angle φ is set to 145°, and resonator-resonator distance T is set to 30 mm In both FIG. 13A and FIG. 13B, the coupling coefficient decreases when resonator-resonator distance T is changed from 25 mm to 30 mm. Thus, it is necessary to increase the input impedance of resonator 111 to achieve impedance matching between input/output line 112 and resonator 111.

In FIG. 13A, when resonator-resonator distance T is 25 mm, impedance matching is achieved in a state in which port angle φ is 22°, and the frequency characteristic related to the transmittance is maximally flat (broken line). When resonator-resonator distance T is changed from 25 mm to 30 mm, the input impedance of resonator 111 is to small in a state in which port angle φ is 22°, and thus the frequency characteristic related to the transmittance is single-humped with one peak and the transmittance significantly decreases (one-dot chain line). In this case, port angle φ may be decreased from 22° to 16° to increase the input impedance of resonator 111, and accordingly the frequency characteristic related to the transmittance can be changed to maximally flat.

On the other hand, in FIG. 13B, when resonator-resonator distance T is 25 mm, impedance matching is achieved in a state in which electrode-resonator distance L is 1.5 mm, and the frequency characteristic related to the transmittance is maximally flat (not illustrated). When resonator-resonator distance T is changed from 25 mm to 30 mm, the input impedance of resonator 111 is too small in a state in which electrode-resonator distance L is 1.5 mm, and thus the frequency characteristic related to the transmittance is single-humped with one peak and the transmittance significantly decreases (one-dot chain line). In this case, electrode-resonator distance L may be increased from 1.5 mm to 2 mm to increase the input impedance of resonator 111, and accordingly the frequency characteristic related to the transmittance can be changed to maximally flat (solid line). In FIG. 13B, as in FIG. 13A, the frequency characteristic related to the transmittance can be changed to maximally flat by changing port angle φ from 145° to 85° with electrode-resonator distance L being 1.5 mm (broken line).

As is understood from the comparison between the solid line and the broken line in FIG. 13B, the width of the pass band in the maximally flat frequency characteristic related to the transmittance can be further increased by achieving impedance matching by changing electrode-resonator distance L than by achieving impedance matching by changing port angle φ. Thus, it is more preferable to adjust the input impedance by changing electrode-resonator distance L than by changing port angle φ.

The reason for such a phenomenon is estimated that, when impedance matching is achieved by decreasing port angle φ as in FIG. 13A, the electrical connection position between input/output line 112 and resonator 111 is near the center of resonator 111 having a large electrical amplitude, and as a result the resonance characteristic of resonator 111 degrades. In contrast, when impedance matching is achieved by changing electrode-resonator distance L as in FIG. 13B, the electrical connection position between input/output line 112 and resonator 111 can be set to an end portion of the ring (near opening portion 111a), and thus the resonance characteristic of resonator 111 does not degrade.

Also in resonance apparatuses 110 and 210 according to the present embodiment, it is possible to adjust electrode-resonator distance L by the operation of control section 114 so as to achieve a maximally flat frequency characteristic related to the transmittance, as in the operation flow illustrated in FIG. 7.

[Advantages]

As described above, in resonance apparatuses 110 and 210 according to the present embodiment, the input impedance (or the output impedance) of resonators 111 and 211 can be adjusted by changing the positional relationship between input/output lines 112 and 212 and resonators 111 and 211 (here, electrode-resonator distance L).

Accordingly, it is possible to adjust the input impedance of resonator 111 (or the output impedance of resonator 211) in accordance with the state of electromagnetic coupling between resonator 111 and resonator 211 and change the frequency characteristic related to the transmittance from double-humped to maximally flat.

In addition, in resonance apparatuses 110 and 210 according to the present embodiment, the input/output lines 112 and 212 and resonators 111 and 211 are electrically connected to each other by capacitive coupling and the input impedance of resonator 111 (or the output impedance of resonator 211) is adjusted by adjusting the capacitance, and thus it is possible to further increase the width of the pass band in the maximally flat frequency characteristic related to the transmittance.

Embodiment 3

In the above embodiments, resonance apparatuses 110 and 210 are applied to transmission of the power for operating electric load 230. Alternatively, resonance apparatuses 110 and 210 may be applied to transmission of a signal.

For example, resonance apparatuses 110 and 210 according to the present disclosure can be applied to transmission of a signal between circuit boards. In the related art, use of a bonding pad or bonding wire makes it impossible to take high-frequency power out of a semiconductor chip because of reflection or radiation. On the other hand, in resonance apparatuses 110 and 210 according to the present disclosure, high-frequency power generated by a semiconductor chip can be transmitted and received between circuit boards without loss. In addition, millimeter wave wireless communication can be achieved with very low cost by leading the high-frequency power to an antenna.

Other Embodiments

The present disclosure is not limited to the above embodiments, and various modifications can be made. For example, it is obvious that various combinations of aspects described in the individual embodiments may be used.

In the above embodiments, a description has been given of an example of the adjustment mechanism capable of adjusting port angles φ or electrode-resonator distances L of input/output lines 112 and 212 with respect to resonators 111 and 211. In the present disclosure, any other adjustment mechanisms may be used to adjust port angles φ or electrode-resonator distances L.

In the above embodiments, a description has been given of an example of the support structures of individual components of resonance apparatuses 110 and 210. In the present disclosure, the support structures of individual components of resonance apparatuses 110 and 210 can be variously changed. For example, circuit boards 120a and 220a may be disposed at front-surface sides of resonators 111 and 211 (i.e., the side at which resonators 111 and 211 face each other) or at side-surface sides of resonators 111 and 211. Electrode portions 112a and 212a may be disposed at front-surface sides of resonators 111 and 211 so as to face resonators 111 and 211. In other words, the disposition of individual components of resonance apparatuses 110 and 210 is not limited as long as the power transmission between resonators 111 and 211 is not hindered.

In the above embodiments, port angles φ and electrode-resonator distances L of input/output lines 112 and 212 with respect to resonators 111 and 211 are automatically adjusted by control section 114 (or control section 214). Alternatively, port angles φ and electrode-resonator distances L of input/output lines 112 and 212 with respect to resonators 111 and 211 may be manually adjusted by a user.

In the above embodiments, the shapes in which opening portions 111a and 211a are formed in parts of ring-shaped closed-curve lines are described as an example of the shapes of resonators 111 and 211. The shapes of resonators 111 and 211 can be variously changed and may be, for example, substantially rectangular loop shapes having opening portions 111a and 211a formed in parts thereof. The ring length of each of resonators 111 and 211 may be an odd multiple of ½ of the wavelength of high-frequency power.

In the above embodiments, resonator 111 and resonator 211 have the same shape. Alternatively, resonator 111 and resonator 211 may have different shapes. For example, resonator 111 and resonator 211 may have different ring sizes or different ring widths. In this case, port angle $\phi_A$ of resonator 111 and port angle $\phi_B$ of resonator 211 may be made adjustable separately.

In the above embodiments, electrode portions 112a and 212a of input/output lines 112 and 212 are circular as an example. The shapes of electrode portions 112a and 212a can be variously changed and may be, for example, open ring shapes similar to the shapes of resonators 111 and 211.

In the above embodiments, resonance apparatus 110 and resonance apparatus 210 have the same configuration, but resonance apparatus 110 and resonance apparatus 210 need not necessarily have the same configuration. For example, input/output line 112 of resonance apparatus 110 may be formed of a coaxial line, and input/output line 212 of resonance apparatus 210 may be formed of a metallic pin.

Specific examples of the present disclosure have been described above. These are merely examples and do not limit the claims. The techniques described in the claims include modifications or changes of the above-described specific examples.

INDUSTRIAL APPLICABILITY

A resonance apparatus according to the present disclosure is capable of addressing a change in the state of electromagnetic coupling between resonators when performing transmission and reception of high-frequency power in a noncontact manner by using the electromagnetic coupling between the resonators.

REFERENCE SIGNS LIST

U Power transmission apparatus
100 Transmitting apparatus
110 First resonance apparatus
111 First resonator
111S Support rod
111a Opening portion
111b Protruding portion
112 First input/output line
112a Electrode portion
113 First ground plate
114 First control section
115 First driving section
115a Gear wheel
120 Oscillator
120a Circuit board
130 Power source
200 Receiving apparatus
210 Second resonance apparatus
211 Second resonator
211S Support rod
211a Opening portion
212 Second input/output line
212a Electrode portion
213 Second ground plate
214 Second control section
214a Current sensor
215 Second driving section
215a Gear wheel
220 Rectifier circuit
220a Circuit board
230 Electric load
L Electrode-resonator distance
T Resonator-resonator distance
$\phi_A$, $\phi_B$ Port angle

The invention claimed is:
1. A resonance apparatus, comprising:
a resonator having a structure in which a part of a closed-curve line is opened, the resonator performing transmission or reception of high-frequency power or a high-frequency signal to or from another resonator in a noncontact manner by using electromagnetic coupling, the other resonator being disposed facing the resonator and having a shape similar to a shape of the resonator; and an input/output line that extends from a circuit board disposed near the resonator toward the resonator, wherein an electrode portion disposed at an end of the input/output line faces a rear surface or a front surface of the resonator, the input/output line performing transmission or reception of the power or the signal to or from the resonator via the electrode portion, wherein the resonator has, at a center position in a longitudinal direction of the resonator, a protruding portion protruding from a side surface of the resonator toward the central axis of the resonator, the resonator and the protruding portion being integrally formed of a metal plate, and wherein the resonator is supported, at the position of the central axis thereof, by a support rod disposed through the protruding portion and extending in an up-down direction, and the resonator is configured to rotate around the central axis of the resonator by rotation of the support rod so as to change the port angle of the input/output line connected to the resonator, the port angle being a position at which the resonator is electrically connected to the electrode portion.

2. The resonance apparatus according to claim 1, wherein the electrode portion is disposed so as to be separated from the rear surface or the front surface of the resonator and performs transmission or reception of the power or the signal to or from the resonator by capacitive coupling.

3. The resonance apparatus according to claim 1, wherein the input/output line is formed of a coaxial line that extends from a surface of the circuit board toward the rear surface of the resonator.

4. The resonance apparatus according to claim 1, wherein the input/output line is formed of a metallic pin that extends from a surface of the circuit board toward the rear surface of the resonator.

5. The resonance apparatus according to claim 1, wherein a positional relationship between the electrode portion and the resonator in a circumferential direction of the resonator is adjustable.

6. The resonance apparatus according to claim 1, wherein a distance between the electrode portion and the resonator in a direction in which the electrode portion faces the resonator is adjustable.

7. The resonance apparatus according to claim 1, wherein an angle formed between a line connecting a center point and an open end in the resonator and a line connecting a center point and an open end in the other resonator is 90° or more in plan view.

8. A power transmission apparatus, comprising:
a first resonance apparatus; and
a second resonance apparatus,
the power transmission apparatus performing transmission and reception of a power or a signal in a noncontact manner between resonators respectively included in the first resonance apparatus and the second resonance apparatus,
the first resonance apparatus and the second resonance apparatus each including
a corresponding one of the resonators that has a structure in which a part of a closed-curve line is opened, the corresponding resonator performing transmission or reception of a high-frequency power or a high-frequency signal to or from the other one of the resonators in a noncontact manner by using electromagnetic coupling, the other resonator being disposed facing the corresponding resonator and having a shape similar to a shape of the corresponding resonator, and
an input/output line that extends from a circuit board disposed near the corresponding resonator toward the corresponding resonator,
wherein an electrode portion disposed at an end of the input/output line faces a rear surface or a front surface of the corresponding resonator, the input/output line performing transmission or reception of the power or the signal to or from the corresponding resonator via the electrode portion,
wherein the corresponding resonator has, at a center position in a longitudinal direction of the corresponding resonator, a protruding portion protruding from a side surface of the corresponding resonator toward the central axis of the corresponding resonator, the corresponding resonator and the protruding portion being integrally formed of a metal plate, and wherein the corresponding resonator is supported, at the position of the central axis thereof, by a support rod disposed through the protruding portion and extending in an up-down direction, and the corresponding resonator is configured to rotate around the central axis of the resonator by rotation of the support rod so as to change the port angle of the input/output line connected to the corresponding resonator, the port angle being a position at which the corresponding resonator is electrically connected to the electrode portion.

9. A power transmission method using the power transmission apparatus according to claim 8.

* * * * *